US008286995B2

(12) United States Patent
Shibayama et al.

(10) Patent No.: US 8,286,995 B2
(45) Date of Patent: Oct. 16, 2012

(54) SIDE AIRBAG APPARATUS

(75) Inventors: Koji Shibayama, Kiyosu (JP); Yuji Sato, Kiyosu (JP); Yoshiaki Goto, Kiyosu (JP); Yasushi Okada, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 128 days.

(21) Appl. No.: 12/801,609

(22) Filed: Jun. 17, 2010

(65) Prior Publication Data

US 2011/0001308 A1 Jan. 6, 2011

(30) Foreign Application Priority Data

Jul. 3, 2009 (JP) ................................. 2009-158564
Mar. 16, 2010 (JP) ................................. 2010-059410

(51) Int. Cl.
*B60R 21/207* (2006.01)
(52) U.S. Cl. .................................................. 280/730.2
(58) Field of Classification Search .................. 280/729, 280/730.2, 801.1
See application file for complete search history.

(56) References Cited

U.S. PATENT DOCUMENTS

| 4,294,467 | A | * | 10/1981 | Frantom | ..................... | 280/801.1 |
| 7,021,654 | B2 | * | 4/2006 | Honda et al. | ............... | 280/730.2 |
| 2005/0104342 | A1 | * | 5/2005 | Jackson et al. | ............. | 280/730.2 |
| 2006/0267317 | A1 | * | 11/2006 | Ida et al. | .................... | 280/730.2 |
| 2008/0061538 | A1 | * | 3/2008 | Mohammad et al. | ...... | 280/730.2 |

FOREIGN PATENT DOCUMENTS

JP A-2003-261000 9/2003

OTHER PUBLICATIONS

Anatomy of a Crash-Test Dummy, by Erico Guizzo, published in IEEE Spectrum on Oct. 2007, available at http://spectrum.ieee.org/computing/embedded-systems/anatomy-of-a-crashtest-dummy/0.*

* cited by examiner

*Primary Examiner* — Joseph Rocca
(74) *Attorney, Agent, or Firm* — Posz Law Group, PLC

(57) ABSTRACT

A side airbag apparatus includes an airbag 50 that is inflated and deployed in a space between an occupant seated in a vehicle seat 12 and a vehicle body side portion by inflation gas that is supplied from an inflator 41 in response to an impact applied to the vehicle from a side. The airbag 50 has a lumbar region protecting portion 54 that is inflated and deployed beside at least the lumbar region PP of the occupant, thereby protecting the lumbar region PP. In the side airbag apparatus, the lumbar region protecting portion 54 has a part A at which the thickness in the vehicle widthwise direction is the greatest. The position in the vertical direction of the part A is lower than a highest point B in a front portion of the seat cushion 13 of the vehicle seat 12. These settings allow the part A to be inflated and deployed at a position that is spaced downward from the upper end 63U of an ilium of the occupant P.

15 Claims, 16 Drawing Sheets

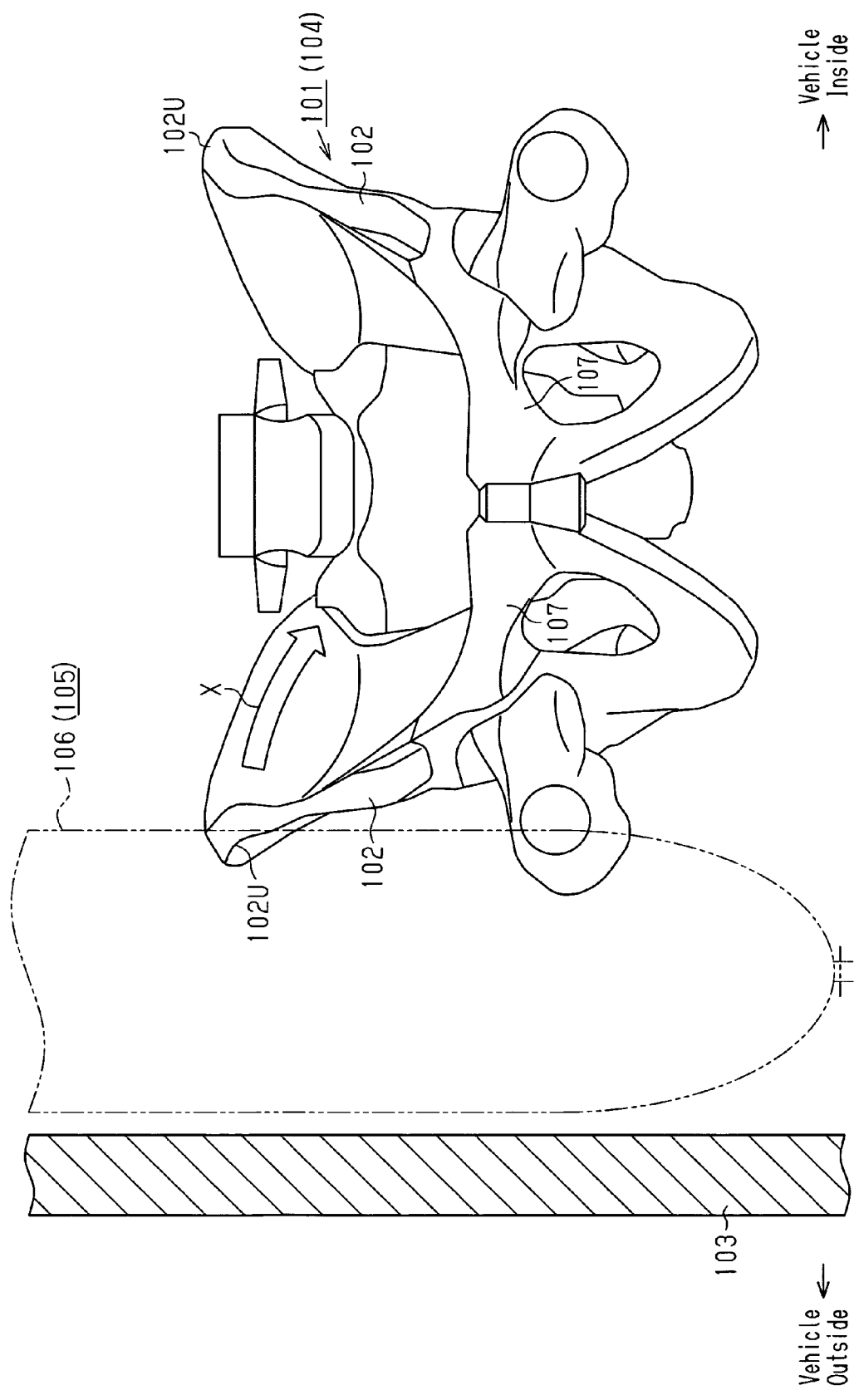

US 8,286,995 B2

SIDE AIRBAG APPARATUS

BACKGROUND OF THE INVENTION

The present invention relates to a side airbag apparatus that inflates and deploys an airbag in a space between a vehicle body side portion such as a side door and an occupant seated in a vehicle seat when an impact is applied from a side of the vehicle, thereby reducing the impact using the airbag to protect at least the lumbar region of the occupant.

A side airbag apparatus is effective as means for protecting an occupant seated in a vehicle seat when an impact is applied to the vehicle from a side due to a side collision. Such a side apparatus includes an inflator that discharges inflation gas in response to an impact to inflate and deploy an airbag in a space between an occupant and a vehicle body side portion. One type of such airbag apparatuses includes an airbag with a lumbar region protecting portion, which is inflated and deployed beside at least the lumbar region of an occupant to protect the lumbar region (see Japanese Laid-Open Patent Publication No. 2003-261000).

FIG. 18 shows the positional relationship of a body side portion 103, an airbag 105, and the pelvis 101 in the lumbar region 104 of an occupant. As shown in FIG. 18, the pelvis 101 includes a couple of ilia 102. An upper end portion 102U of each ilium 102 protrudes outward in the widthwise direction of the human body (left-right direction in FIG. 18). Thus, when the airbag 105 is inflated and deployed such that the lumbar region protecting portion 106 has an excessive thickness along the width of the vehicle in a space between the body side portion 103 and the upper end portion 102U of the ilium 102 on the vehicle outer side, the ilium 102 is pushed toward the inside of the vehicle through the upper end portion 102U. This generates an inward and downward rotation moment in the ilium 102 on the vehicle outer side as illustrated by arrow X in FIG. 18. As a result, an excessive load can be concentrated on a pubis 107 connected to the lower end of the ilium 102.

SUMMARY OF THE INVENTION

Accordingly, it is an objective of the present invention to provide a side airbag apparatus that prevents an excessive load from being concentrated on a pubis, while protecting the lumbar region of an occupant with a lumbar region protecting portion.

To achieve the foregoing objective and in accordance with one aspect of the present invention, a side airbag apparatus mounted on a vehicle having a vehicle seat and a body side portion is provided. The apparatus includes an inflator and an airbag. The airbag is inflated and deployed in a space between an occupant seated in the vehicle seat and the vehicle body side portion by inflation gas that is supplied from the inflator in response to an impact applied to the vehicle from a side. The airbag includes a lumbar region protecting portion that is inflated and deployed at least beside the lumbar region of the occupant, thereby protecting the lumbar region. The vehicle seat includes a seat cushion that is inclined such that the height of the seat cushion in the vertical direction increase toward the front end. The lumbar region protecting portion has a part at which the thickness in the vehicle widthwise direction is the greatest, the position in the vertical direction of the part being lower than a highest point in a front portion of the seat cushion.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 18 is a partial cross-sectional front view showing the positional relationship between the occupant's pelvis, a body side portion, and an airbag of a conventional side airbag apparatus.

DETAILED DESCRIPTION OF THE PREFERRED EMBODIMENTS

First Embodiment

A first embodiment of the present invention will now be described with reference to FIGS. 1 to 10.

In the following, the direction in which a vehicle advances forward will be referred to as the front, and the reverse direction will be referred to as the rear. Also, the left-right direction refers to the widthwise direction of the vehicle, that is, the left-right direction when the vehicle is driving forward.

Figure 2:
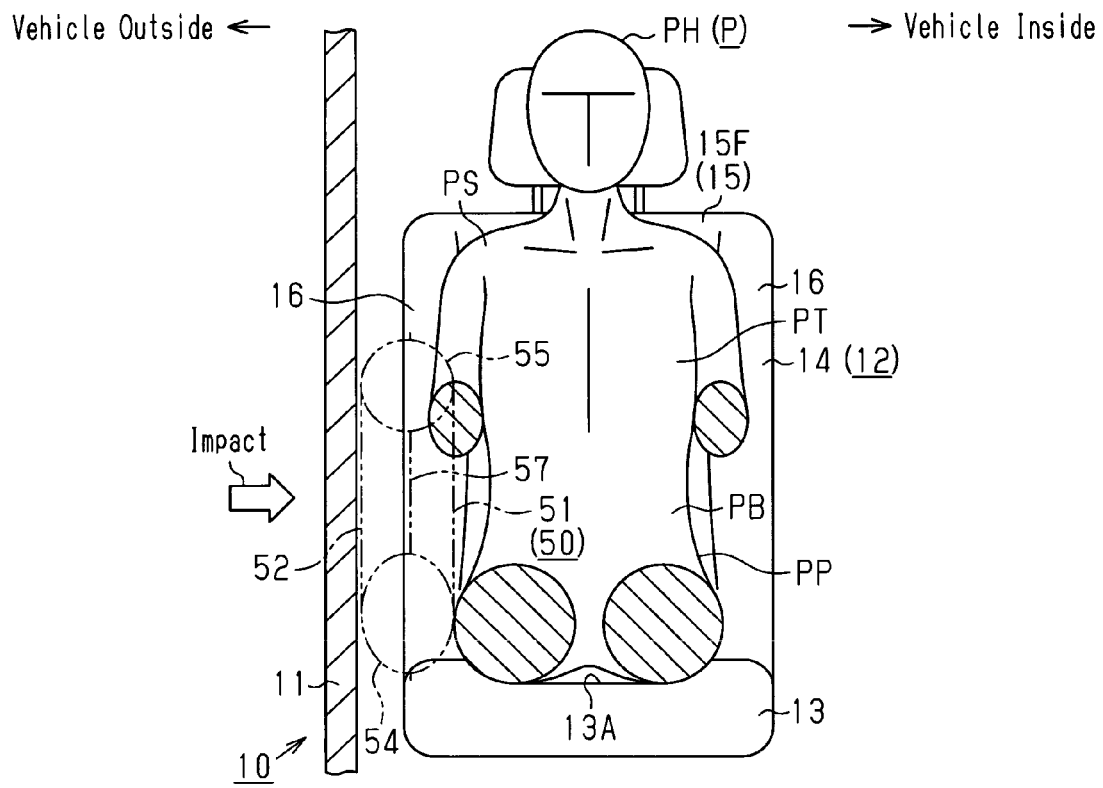
FIG. 2 is a cross-sectional front view showing, together with the occupant and the airbag, the positional relationship between the vehicle seat of FIG. 1 and a body side portion.
Figure 3:
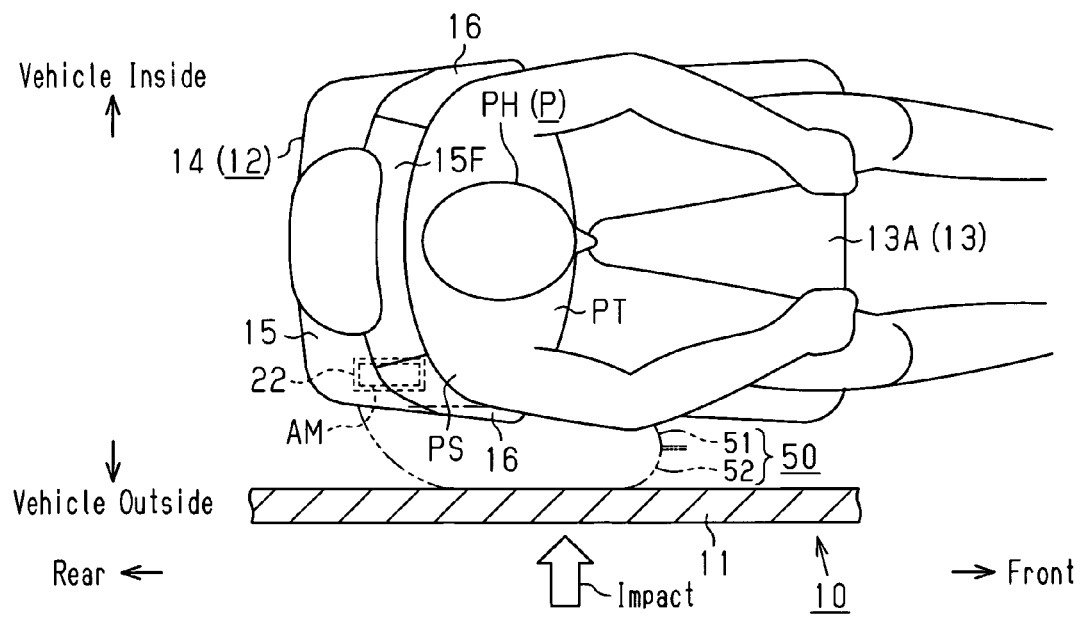
FIG. 3 is a cross-sectional plan view showing, together with the occupant and the airbag, the positional relationship between the vehicle seat of FIG. 1 and the body side portion.

As shown in FIGS. 2 and 3, a vehicle seat 12 is arranged on the inner side (right side as viewed in FIG. 2, upper side as viewed in FIG. 3) of a body side portion 11 of a vehicle 10. The body side portion 11 refers to members that are located in a side of the vehicle 10, mainly doors and pillars. For example, part of the body side portion 11 corresponding to the front seat includes a front door and a center pillar (B-pillar). Part of the body side portion 11 corresponding to the backseat includes a rear part of the side door (rear door), a C-pillar, a front part of the wheel well, and a rear quarter.

As shown in FIGS. 2, 3, 4(A), and 4(B), the vehicle seat 12 includes a seat cushion 13 and a backrest 14. The backrest 14 extends upward from the rear end of the seat cushion 13, and the inclination angle of the backrest 14 is adjusted by a tilt adjusting mechanism (not shown). A seating surface 13A of the seat cushion 13, on which an occupant P is seated, is inclined such that its height in the vertical direction increases toward the front end. The seating surface 13A of the seat cushion 13 is the highest at the front end.

The backrest 14 includes a backrest main body 15 and a pair of side support portions 16 provided on both sides of the backrest main body 15. A front surface 15F of the backrest main body 15 is inclined rearward. The backrest main body 15 supports the occupant P from behind with the front surface 15F. The side support portions 16 project further forward than the front surface 15F of the backrest main body 15, so as to restrict movement in the vehicle widthwise direction of the occupant P seated on the seat cushion 13 and leaning against the backrest main body 15.

Next, the internal structure of a side portion of the backrest 14 on the vehicle outer side including a side support portion 16 will now be described.

Figure 5:
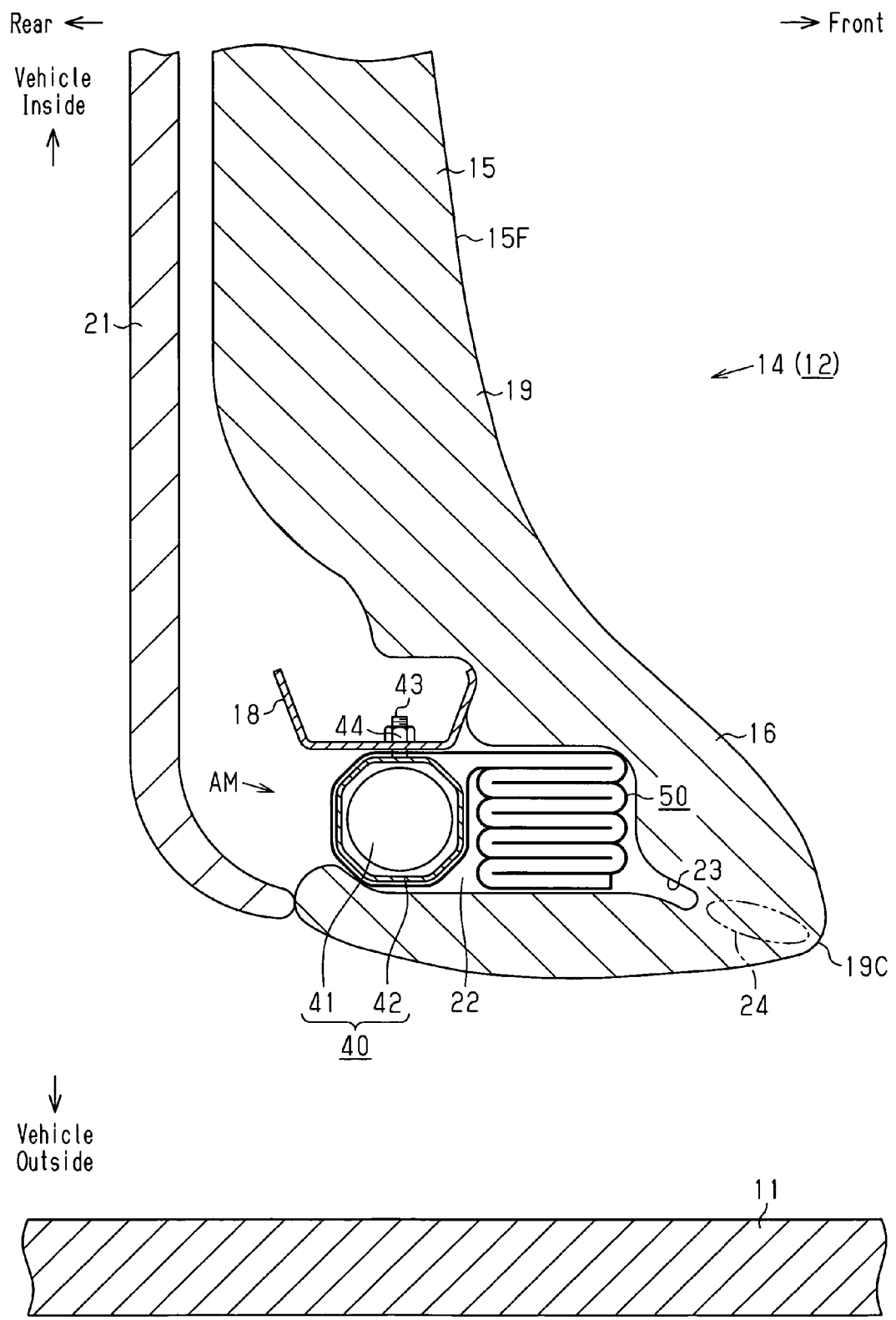
FIG. 5 is a partial cross-sectional plan view showing, together with the body side portion, the airbag module incorporated in the storage portion of the backrest.
Figure 10:
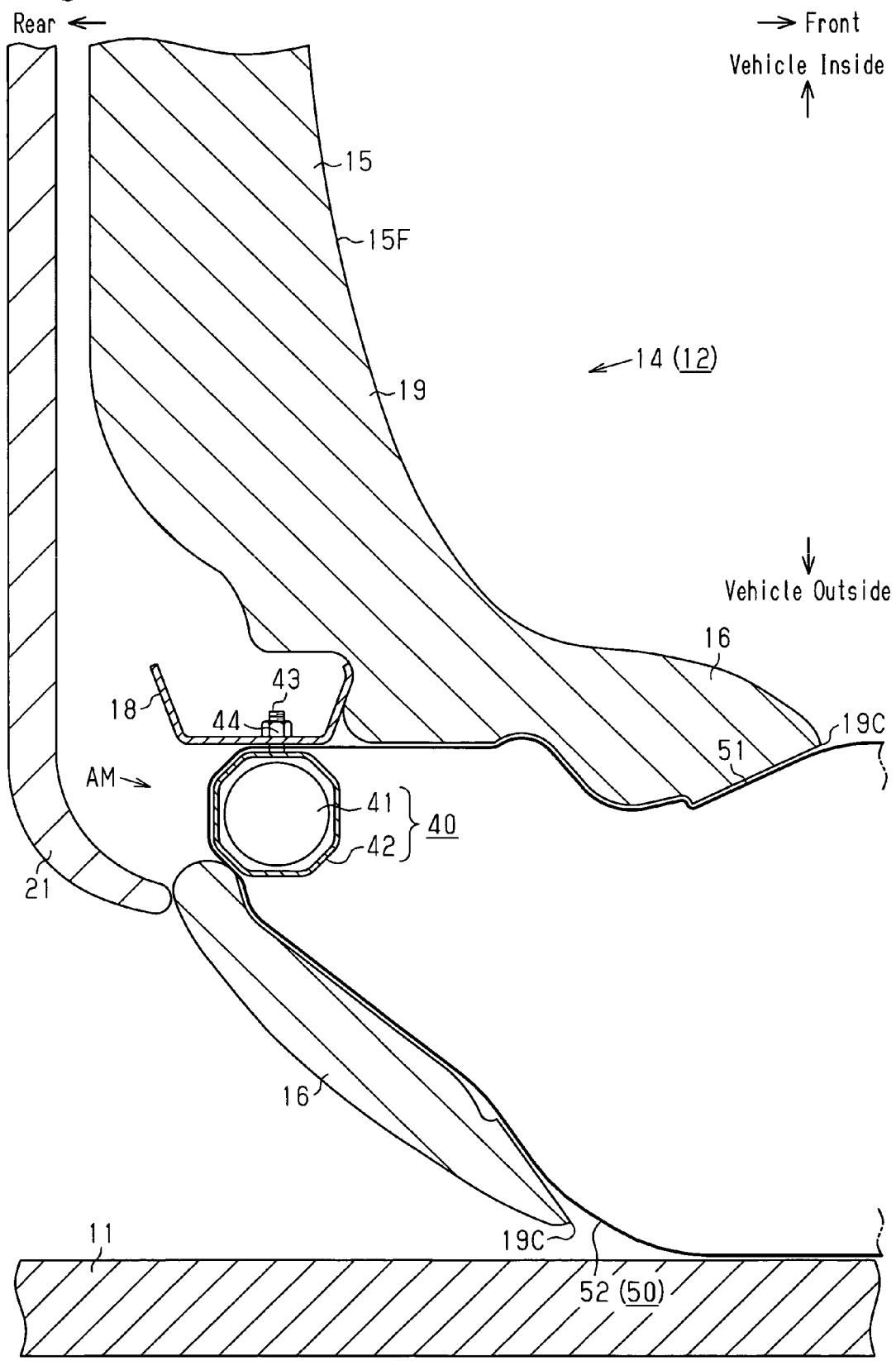
FIG. 10 is a partial cross-sectional plan view showing a state in which the airbag has popped out of the backrest and been inflated and deployed from the state shown in FIG. 5.

The backrest 14 incorporates a seat frame, which serves as a framework. As shown in FIG. 5, a part of the seat frame is located in the vicinity of the boundary between a backrest main body 15 and the side support portion 16 on the vehicle outer side in the backrest 14. A part of the seat frame shown in FIG. 5 (hereinafter, referred to as a side frame portion 18) is formed by bending a metal plate. A seat pad 19, which is made of an elastic material such as urethane foam, is arranged on the front side of the seat frame including the side frame portions 18. A rigid back board 21, which is made of synthetic resin, is arranged on the rear side of the seat frame. The seat pad 19 is covered with a cover sheet (not shown). In FIG. 10, which will be described below, the cover sheet is omitted, also.

An storage portion 22 is provided in the seat pad 19 at a position in the vicinity of the vehicle outer side of the side frame portion 18. The storage portion 22 is located diagonally behind the occupant P seated in the vehicle seat 12 (refer to FIG. 3). An airbag module AM, which forms a main part of the side airbag apparatus, is located in the storage portion 22.

A slit 23 extends diagonally forward and outward from the outer and front corner of the storage portion 22. A part between a front corner 19C of the seat pad 19 and the slit 23 (the area surrounded by an alternate long and two short dashes line in FIG. 5) forms a breakable portion 24, which is broken by an airbag 50, which will be discussed below.

Figure 6:
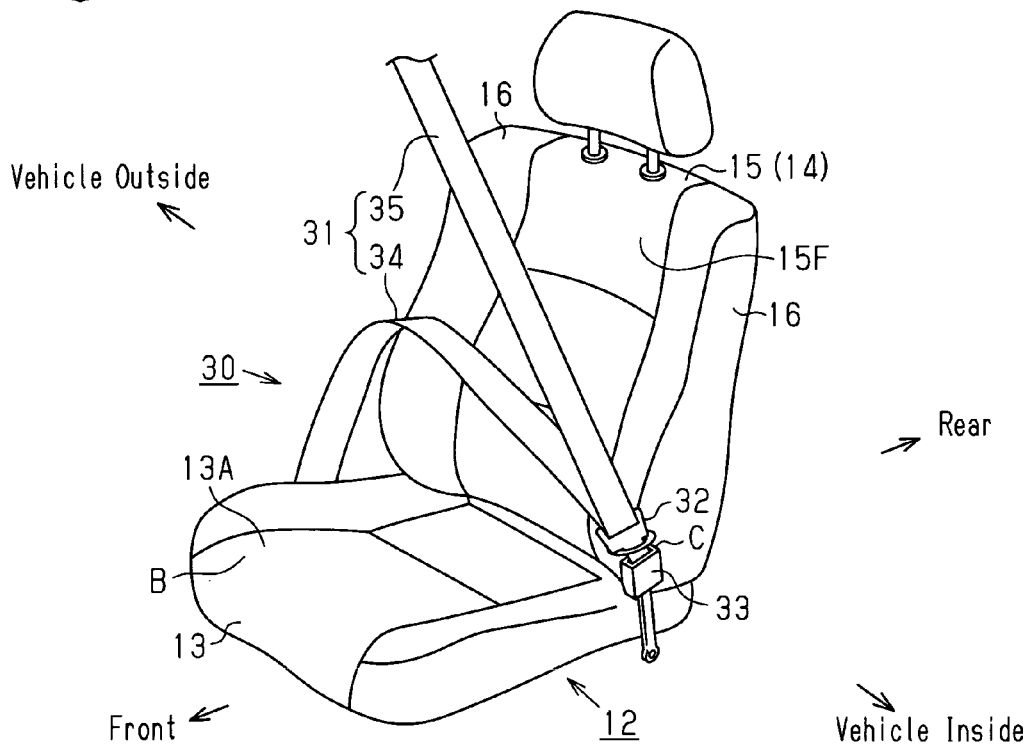
FIG. 6 is a partial perspective view showing, together with a seat belt apparatus, the vehicle seat as viewed from inside the vehicle.
Figure 8:
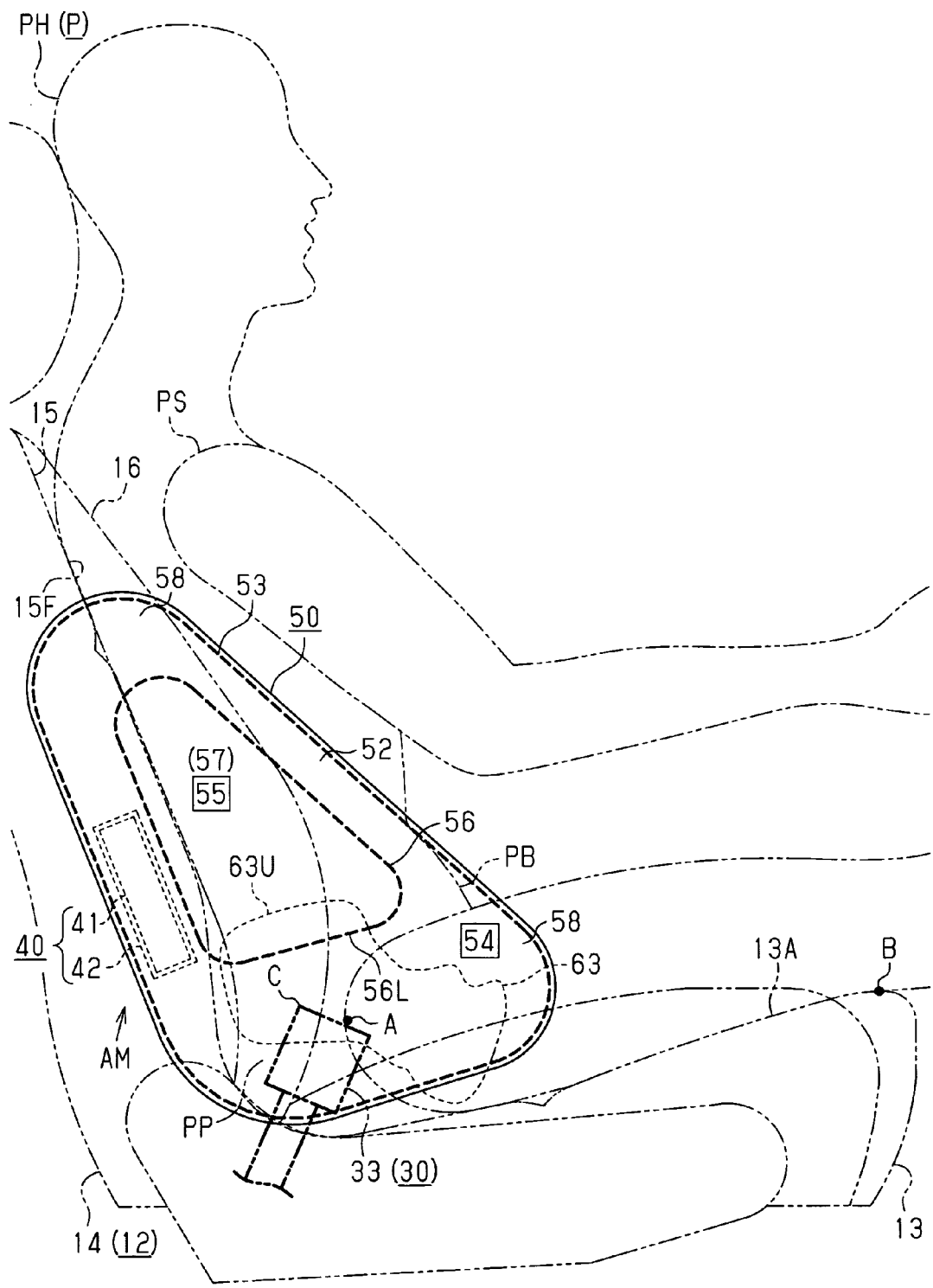
FIG. 8 is a side view illustrating, together with the vehicle seat, the occupant, and the buckle, an airbag module with the airbag spread.

As shown in FIGS. 6 and 8, the vehicle is equipped with a seat belt apparatus 30 for restraining the occupant P seated in the vehicle seat 12. FIG. 6 shows the vehicle seat 12 and the seat belt apparatus 30 viewed from diagonally front on the vehicle inner side. Also, FIG. 8 shows the vehicle seat 12 and the seat belt apparatus 30, together with the side airbag apparatus and the occupant P, as viewed from outside the vehicle. In FIG. 8, a buckle 33, which is actually invisible on the vehicle outer side of the vehicle seat 12, is shown in order to describe the position and height of the buckle 33 in the seat belt apparatus 30.

The seat belt apparatus 30 has belt-like webbing 31 for restraining the occupant P, a tongue 32 attached to the webbing 31 to be movable along the longitudinal direction of the webbing 31, and the buckle 33 provided on the vehicle inner side of the seat cushion 13. The tongue 32 is detachably engaged with the buckle 33. The webbing 31 includes an end that is fixed to the vehicle outer side of the seat cushion 13 and another end that is wound by a seat belt retractor (not shown). In the seat belt apparatus 30, the tongue 32 is slid relative to the webbing 31, so as to change the lengths of a lap belt portion 34 and a shoulder belt portion 35.

The lap belt portion 34 refers to a section of the webbing 31 that extends from the tongue 32 to the fixed end of the webbing 31. The lap belt portion 34 extends horizontally from one side of the lumbar region PP of the seated occupant P to the other side via the front side of the lumbar region PP. The shoulder belt portion 35 refers to a section of the webbing 31 that extends from the tongue 32 to the seat belt retractor. The shoulder belt portion 35 extends diagonally from a shoulder PS of the seated occupant P to the vehicle outer side of the lumbar region PP via the front side of a thorax PT (refer to FIGS. 2 and 3).

The airbag module AM, which is incorporated in the backrest 14, includes as its main components an inflator assembly 40 and the airbag 50.

Each of the components will now be described. In the present embodiment, the up-down direction and the front-rear direction of the components of the airbag module AM are defined with reference to the backrest 14 of the vehicle seat 12 as shown in FIG. 8. A direction along which the backrest 14 stands is defined as the up-down direction, and a direction along the thickness of the backrest 14 is defined as the front-rear direction. Since the backrest 14 is slightly inclined rearward in use, the up-down direction is not strictly the vertical direction, but corresponds to a slightly inclined direction. Likewise, the front-rear direction is not strictly a horizontal direction, but corresponds to a slightly inclined direction.

<Inflator Assembly 40>

Figure 4A:
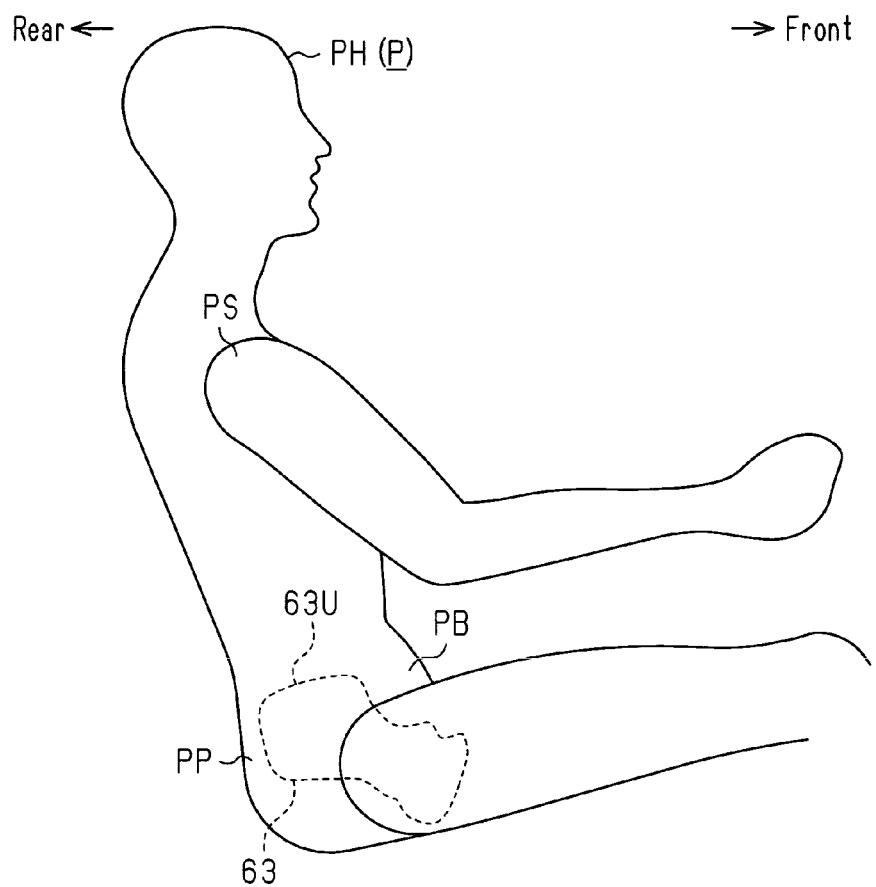
FIG. 4(A) is a side view illustrating an occupant in a seated position.
Figure 4B:
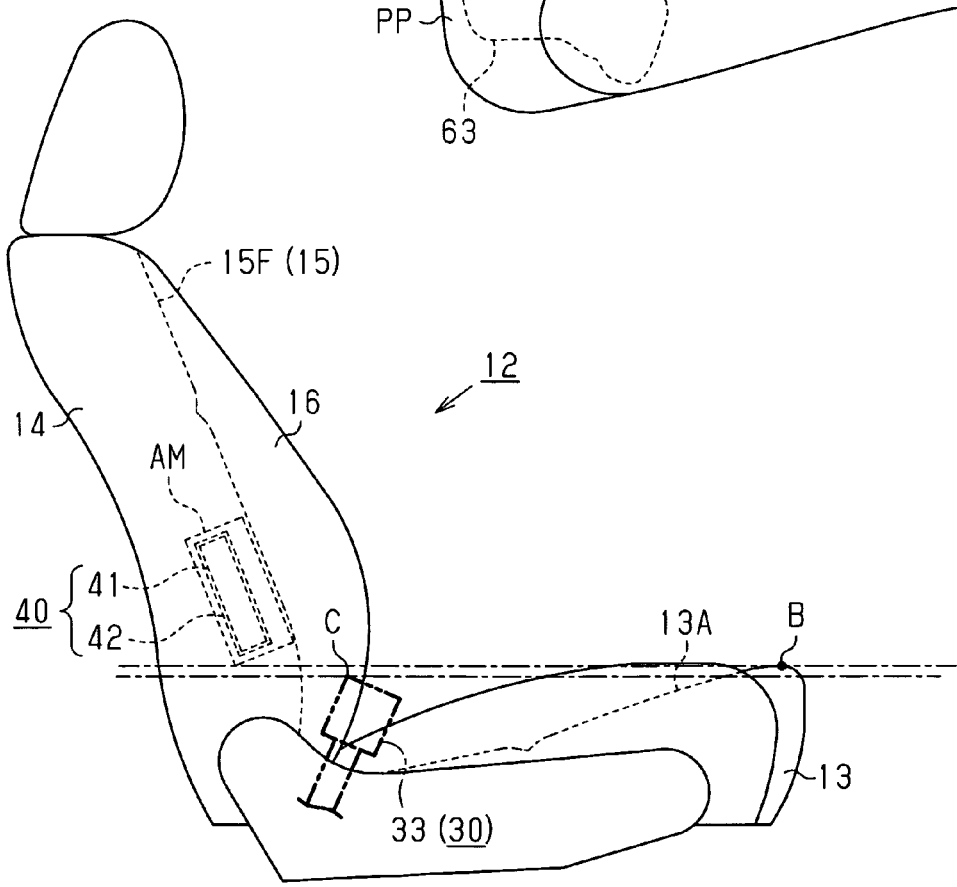
FIG. 4(B) is a side view illustrating, together with the buckle of a seat belt apparatus, the vehicle seat in which the airbag module is incorporated.

As shown in FIGS. 4(B) and 5, the inflator assembly 40 includes a gas source, which is an inflator 41, and a retainer 42 mounted on the outer surface of the inflator 41. In the present embodiment, a pyrotechnic inflator is used as the inflator 41. The inflator 41 is substantially columnar and contains in it gas generating agent (not shown), which generates inflation gas.

A harness (not shown), which is wiring for applying control signals to the inflator 41, is connected to one end of the inflator 41.

In place of the pyrotechnic inflator 41 using the gas generating agent, it is possible to use a hybrid type inflator, which breaks a partition wall of a high-pressure gas cylinder filled with a high-pressure gas by a low explosive so as to jet out gas.

On the other hand, the retainer 42 functions as a diffuser and secures the inflator 41 to the side frame portion 18 together with the airbag 50. Most part of the retainer 42 is a plate made of, for example, metal, and is formed to be substantially cylindrical through bending. A window (not shown) is formed in the retainer 42, and most of inflation gas ejected by the inflator 41 is discharged to the outside of the retainer 42 through the window.

The retainer 42 is fixed to the side frame portion 18 with securing members, which are a plurality of bolts 43. In other words, the inflator 41 is indirectly fixed by the bolts 43 with the retainer 42.

The inflator 41 and the retainer 42 of the inflator assembly 40 may be formed integrally.

<Airbag 50>

Figure 1:
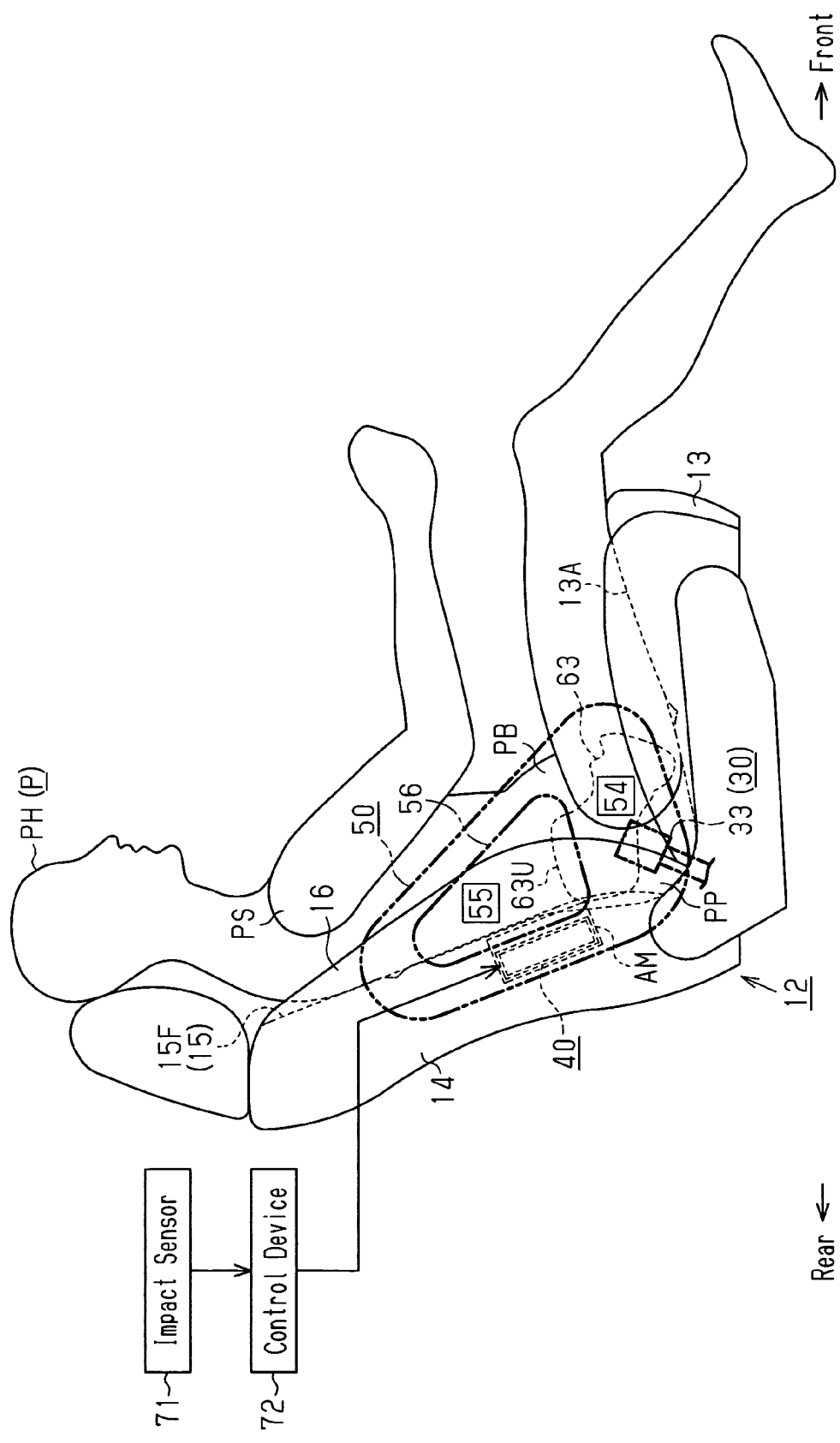
FIG. 1 is a side view illustrating, together with an occupant and an airbag, a vehicle seat equipped with a side airbag apparatus according to a first embodiment of the present invention.

As shown in FIGS. 1 to 3, the airbag 50 is deployed in a deployment region, which is a space between the occupant P seated in the vehicle seat 12 and the body side portion 11. The deployment region ranges from a part corresponding to the lumbar region PP to a part corresponding to the thorax PT of the occupant P. When an impact is applied to the body side portion 11 from a side of the vehicle 10 due to a side collision, the airbag 50 is inflated and deployed in the deployment region by inflation gas supplied by the inflator 41. The airbag 50 pops out substantially forward with a part thereof (rear section) remaining in the storage portion 22, and is inflated and deployed between the occupant P and the body side portion 11. The airbag 50 thus protects the occupant P from the impact of the side collision.

Figure 9:
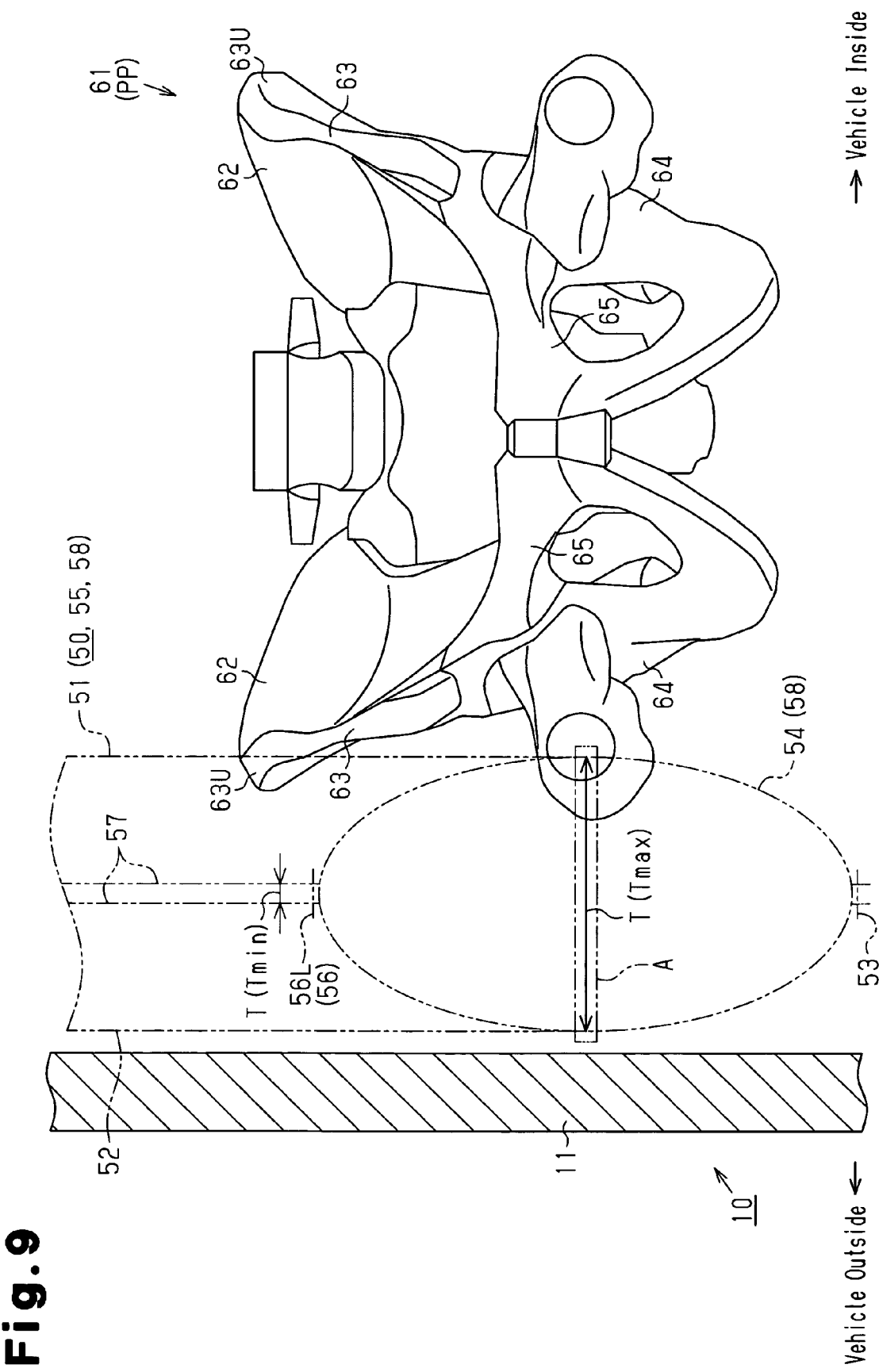
FIG. 9 is a partial cross-sectional front view showing the positional relationship between the occupant's pelvis, the airbag, and the body side portion.

The lumbar region PP of the occupant P, which is protected by the airbag 50, will now be described. FIG. 9 shows a skeletal structure including the pelvis 61 in the lumbar region PP of the occupant P seated in the vehicle seat 12, as viewed from the front of the vehicle. The pelvis 61 is a loop bone located between the vertebral column and the lower limbs, and has a tough structure for supporting the weight of the head PH, the upper limbs, and the torso. The pelvis 61 is stronger and thicker than the walls of the cranial cavity or the thoracic cavity. The pelvis 61 also includes two hip bones 62 forming the sides and front part of the pelvis 61.

The hip bones 62 compose a large part of the pelvis 61. The hip bones 62 are relatively flat and have an irregular shape. Each hip bone 62 is formed by an ilium 63, an ischium 64, and a pubis 65.

Each ilium 63 forms a side of the corresponding hip bone 62, and each ischium 64 forms a lower rear portion of the corresponding hip bone 62. An upper end 63U of each ilium 63 protrudes outward in the widthwise direction of the human body (left-right direction in FIG. 9). Each pubis 65 has an irregular shape and is located below the corresponding ilium 63.

As shown in FIGS. 2, 3, 7, and 8, the airbag 50 is formed by overlapping two base fabric sheets and joining the fabric sheets together. To distinguish the two fabric sheets, one of the fabric sheets located on the vehicle inner side is defied as a fabric sheet 51, and the other fabric sheet located on the vehicle outer side is defined as a fabric sheet 52. The general shape of the fabric sheets 51, 52 is a triangle with a pointed top.

As the material for the fabric sheets 51 and 52, a material that has a high strength and flexibility and is easy to fold is preferable. For example, woven fabric made of polyester threads or polyamide threads is suitable.

Figure 7:
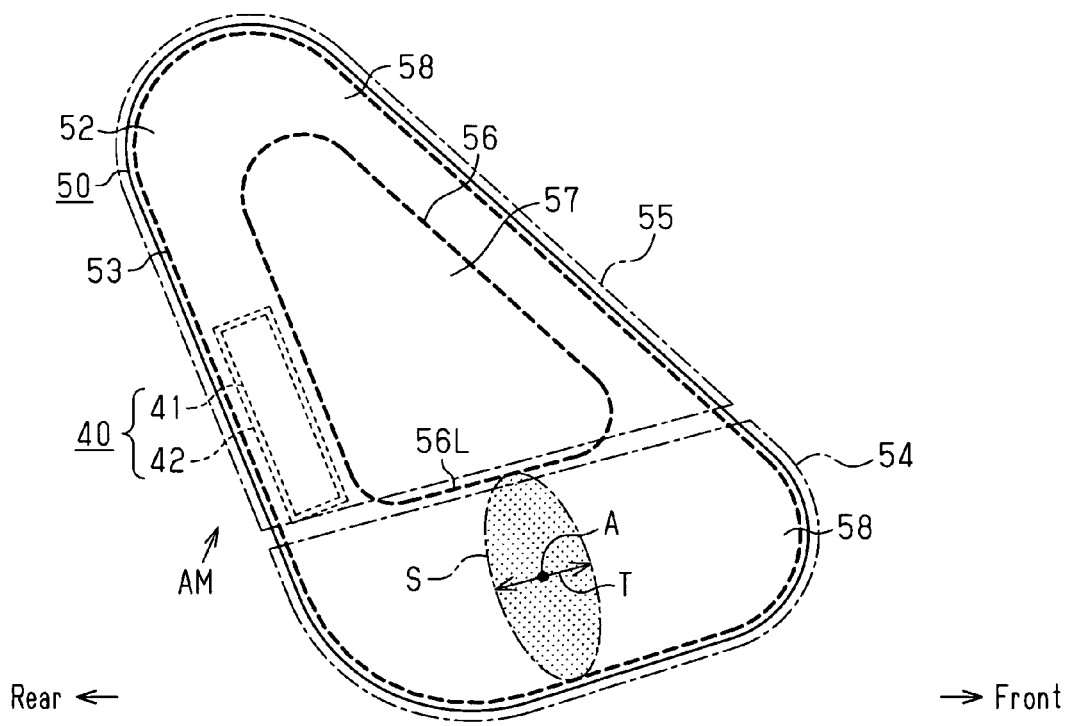
FIG. 7 is a side view illustrating the airbag module with the airbag spread.

The fabric sheets 51, 52 are jointed to each other at a loop peripheral joint portion 53 provided in the periphery. The peripheral joint portion 53 is a closed loop. In the present embodiment, the peripheral joint portion 53 is formed by sewing the peripheries of the fabric sheets 51, 52 together with sewing threads. In FIGS. 7 and 8, the peripheral joint portion 53, which is formed by sewing, is shown by a thick broken line. The general shape of the peripheral joint portion 53 is a triangle with a pointed top, when the airbag 50 is spread without being filled with inflation gas and viewed from the side of the vehicle 10.

The airbag 50 may be formed by a single fabric sheet. In such a case, a single fabric sheet is folded in half at the center in the widthwise direction of the vehicle to overlap with itself, and the peripheries of the overlapped portions are joined to form the airbag 50. The peripheral joint portion 53 may be formed by a method other than sewing using sewing threads as shown above, but may be formed by, for example, using an adhesive.

As shown in FIGS. 7 to 9, a closed loop inner joint portion 56 is provided in the fabric sheets 51, 52. The inner joint portion 56 is spaced inward from the peripheral joint portion 53. The inner joint portion 56 is formed by bringing the fabric sheet 51 on the vehicle inner side and the fabric sheet 52 on the vehicle outer side close to each other, that is, by causing the fabric sheets 51 and 52 contact each other, with the airbag 50 spared. The inner joint portion 56 includes a part that corresponds to an upper end 63U of the ilium 63. In the present embodiment, the inner joint portion 56 is formed by sewing the fabric sheets 51, 52 together with sewing threads.

In FIGS. 7 and 8, the inner joint portion 56, which is formed by sewing, is shown by a thick broken line like the peripheral joint portion 53. The inner joint portion 56 may be formed by a method other than sewing using sewing threads as shown above, but may be formed by, for example, using an adhesive.

Like the peripheral joint portion 53 described above, the general shape of the peripheral joint portion 56 is a triangle with a pointed top, when the airbag 50 is spread without being filled with inflation gas and viewed from the side of the vehicle 10.

The airbag 50 is partitioned into a non-inflation portion 57 and an inflation portion 58 by the inner joint portion 56. The non-inflation portion 57 is a portion of the airbag 50 that is surrounded by the inner joint portion 56, and the inflation portion 58 is a portion of the airbag 50 that is located between the peripheral joint portion 53 and the inner joint portion 56. In other words, the non-inflation portion 57 is a part of the airbag 50 that is inside the inner joint portion 56, and the inflation portion 58 is a part that is outside the inner joint portion 56. The inflator assembly 40 described above is located in the inflation portion 58.

A lower edge 56L of the inner joint portion 56 is located at a position that is slightly lower than and in the vicinity of the side of the upper end 63U of the ilium 63 in the pelvis 61 of the occupant P when the airbag 50 is inflated and deployed.

In the airbag 50, a part of the inflation portion 58 that is below the non-inflation portion 57 is a lumbar region protecting portion 54. The lumbar region protecting portion 54 is inflated and deployed beside a most part of the lumbar region PP of the occupant P, and protects most part of the lumbar region PP from the impact of a side collision. The most part of the lumbar region PP refers to a part of the lumbar region PP that is located lower than the upper end 63U of the ilium 63.

In the airbag 50, a part that is above the lumbar region protecting portion 54 is referred to as an upper region protecting portion 55. The upper region protecting portion 55 includes parts of the non-inflation portion 57 and the inflation portion 58 that are above the lumbar region protecting portion 54. The upper region protecting portion 55 protects the side of a part of the occupant's lumbar region PP and the side of a part that is above the lumbar region PP from the impact of a side collision. When the upper region protecting portion 55 is inflated and deployed, the inflation portion 58 is deployed while being inflated, and the non-inflation portion 57 is deployed without being inflated. A part that is above the lumbar region PP refers to the abdomen PB and the thorax PT of the occupant P. In FIG. 7, the lumbar region protecting portion 54 and the upper region protecting portion 55 are shown by frames depicted with alternate long and short dash lines. In FIG. 7, the alternate long and short dash line showing the lumbar region protecting portion 54 and the alternate long and short dash line showing the upper region protecting portion 55 are separated from each other for convenience of illustration. In reality, the lumbar region protecting portion 54 and the upper region protecting portion 55 contact each other.

Since the inner joint portion 56 is formed as a closed loop, inflation gas from the inflator assembly 40 in the inflation portion 58 does not fill the non-inflation portion 57 although it fills the inflation portion 58. Therefore, the thickness T in the vehicle widthwise direction of the inner joint portion 56 and the non-inflation portion 57 is the minimum thickness Tmin of the airbag 50. Since the inner joint portion 56 separates the inflation portion 58 and the non-inflation portion 57 from each other, the thickness T in the vehicle widthwise direction is the minimum thickness Tmin at the boundary between the inflation portion 58 and the non-inflation portion 57. The parts at which the thickness T is the minimum thickness Tmin include the boundary between the lumbar region protecting portion 54 and the upper region protecting portion 55, that is, a part that corresponds to the lower edge 56L of the inner joint portion 56 and the upper end 63U of the ilium 63.

When supplied with inflation gas, the inflation portion 58 is inflated to have a round shape. The thickness T in the vehicle widthwise direction of the lumbar region protecting portion 54 in the inflation portion 58 is the minimum thickness Tmin at the inner joint portion 56 and the peripheral joint portion 53, at which the fabric sheets 51, 52 are joined to each other. The thickness T of the lumbar region protecting portion 54 increases as the distance from the inner joint portion 56 increases and as the distance from the peripheral joint portion 53 increases. The thickness T of the lumbar region protecting portion 54 is the maximum thickness Tmax at the middle between the inner joint portion 56 and the peripheral joint portion 53.

In FIG. 7, a part shown by halftone dots represents the cross section S of the lumbar region protecting portion 54 in an inflated state. For purposes of illustration, the cross section S is illustrated as a vertically long ellipse. The thickness T in the vehicle widthwise direction of the lumbar region protecting portion 54 is shown by a straight line with an arrow at either end in the cross section S.

A part of the lumbar region protecting portion 54 where the thickness T in the vehicle widthwise direction is the maximum thickness Tmax is defined as a part A, while the highest point of the seat cushion 13 that is located in a front portion is defined as a point B. In the present embodiment, various factors, including the shape, of the airbag 50 are determined such that the part A is located at a lower position than the point B. The position in the vertical direction of the point B, or the height of the point B, is the one in a state where the occupant P is not seated in the vehicle seat 12, that is, in a state where no load exists. That is, the position in the vertical direction of the point B refers to a position in the vertical direction, or a height, without the sinking caused by the seated occupant P. Regardless of the body size of the occupant P seated in the vehicle seat 12, the point B is lower than the upper end 63U of the ilium 63 of the occupant P.

The inflator assembly 40 is arranged in a rear portion of the inflation portion 58, that is, behind the inner joint portion 56, so as to extend substantially in the up-down direction. A plurality of bolts 43 of the retainer 42 are passed through the fabric sheet 51 on the vehicle inner side. The insertion secures the inflator assembly 40, while determining the position of the inflator assembly 40 with respect to the airbag 50.

As shown in FIG. 5, the airbag module AM, which includes as main components the airbag 50 and the inflator assembly 40, is made compact by folding the spread airbag 50 (refer to FIGS. 7 and 8) into a storage state. The airbag module AM is folded in this manner in order that it can be readily accommodated in the storage portion 22 having a limited size in the backrest 14.

The airbag module AM in the storage state is stored in the storage portion 22 of the backrest 14, with the inflator assembly 40 being located at the rear and most of the airbag 50 being located at the front. Then, as described above, the bolts 43, which extend from the retainer 42 and are passed through the airbag 50, are passed through the side frame portion 18 and fastened with nuts 44. The fastening fixes the inflator assembly 40 to the side frame portion 18 together with the airbag 50. The inflator assembly 40 may be fixed to the vehicle 10 (the side frame portion 18) by members other than the bolts 43 and the nuts 44.

As shown in FIG. 1, the side airbag apparatus includes an impact sensor 71 and a control device 72 in addition to the above described airbag module AM. The impact sensor 71 is configured by an acceleration sensor, and is provided in the body side portion 11 of the vehicle 10 (see FIGS. 2 and 3). The impact sensor 71 detects impact applied from the side of the body side portion 11. The control device 72 controls the operation of the inflator 41 based on a detection signal from the impact sensor 71.

The side airbag apparatus of the present embodiment is constructed as described above. In this side airbag apparatus, when an impact the magnitude of which is greater than or equal to a predetermined value is applied to the body side portion 11 of the vehicle 10 due to a side collision, the impact sensor 71 detects the impact. In response to the detection signal, the control device 72 outputs a command signal for actuating the inflator 41 to the inflator 41. In response to the command signal, the gas generating agent in the inflator 41 generates inflation gas G, which is then supplied to the airbag 50. The inflation gas is supplied to the lumbar region protecting portion 54 and the upper region protecting portion 55. The pressure of the inflation gas acts on each part of the airbag 50, which is folded into the storage state, so that the airbag 50 starts inflating in the backrest 14 to be unfolded.

As the airbag 50 is inflated and deployed while being unfolded, the seat pad 19 of the backrest 14 is pressed by the airbag 50 and is eventually broken at the breakable portion 24 (refer to FIG. 5) as shown in FIG. 10. The airbag 50 pops out from the backrest 14 through the broken part, with a part in the vicinity of the inflator assembly 40 remaining in the backrest 14.

Thereafter, the airbag 50 is deployed toward the front of the vehicle 10 in a space between the occupant P (omitted in FIG. 10) and the body side portion 11, which is bulging into the passenger compartment. At this time, the inflation portion 58 of the airbag 50 (including the lumbar region protecting portion 54) is deployed while being inflated, and the non-inflation portion 57 is deployed without being inflated.

In other words, the lumbar region protecting portion 54 is deployed while being inflated on one side of most part of the occupant's lumbar region PP. The most part of the lumbar region PP refers to a part excluding a spot that corresponds to the upper end 63U of the ilium 63. The lumbar region protecting portion 54 reduces the impact of the side collision transmitted to the most part of the lumbar region PP through the body side portion 11.

Beside a part of the lumbar region PP and beside the abdomen PB and thorax PT, an upper portion of the inflation portion 58, that is, the inflation portion 58 of the upper region protecting portion 55 is deployed while being inflated, and the non-inflation portion 57 is deployed without being inflated. The part of the lumbar region PP refers to a part that corresponds to the upper end 63U of the ilium 63.

In the lumbar region PP of the human body, the upper ends 63U of a pair of the ilia 63, which form part of the pelvis 61, protrude outward in the widthwise direction of the human body (left-right direction in FIG. 9). Therefore, in a space beside the upper end 63U of the ilium 63 on the vehicle outer side, if the lumbar region protecting portion 54 is inflated and deployed to have a great thickness T in the vehicle widthwise direction, the ilium 63 is pushed inward of the vehicle through the upper end 63U. This generates an inward and downward rotation moment in the ilium 63 (shown by arrow X in FIG. 18). As a result, an excessive load can be concentrated on a pubis 65 connected to the lower end of the ilium 63.

However, as shown in FIGS. 8 and 9, the point B of the seat cushion 13 is set as a reference in the present embodiment, and the position in the vertical direction of the part A, at which the thickness T of the lumbar region protecting portion 54 is the maximum thickness Tmax, is set lower than the reference. The point B, which is the reference, is located at a position lower than the upper end 63U of the ilium except for cases where the body size of the occupant P seated in the vehicle seat 12 is excessively great or small, that is, as long as the occupant P has an average body size. Since the part A of the lumbar region protecting portion 54 is set to the above described position in the vertical direction, part of the ilium 63 on the vehicle outer side below the upper end 63U is pushed by the part A of the lumbar region protecting portion 54. The part of the ilium 63 below the upper end 63U has a relatively high impact resistance in the pelvis 61. Thus, no problem will occur if this part is pushed by the part A.

Also, the upper end 63U of the ilium 63 on the vehicle outer side is pushed by a part of the lumbar region protecting portion 54 the thickness T of which is smaller than the part A. Specifically, since the lumbar region protecting portion 54 is inflated to have a round shape when supplied with inflation gas, the thickness T of the lumbar region protecting portion 54 decreases as the distance in the vertical direction from the part A, at which the thickness T in the vehicle widthwise direction is the maximum thickness Tmax, increases. Since the part A is located a position lower than the upper end 63U of the ilium 63, the thickness T of the lumbar region protecting portion 54 is smaller than the part A at a position beside the upper end 63U.

Therefore, the force that pushes the upper end 63U of the ilium 63 is smaller than that in the case where the part A, at which the thickness T is the maximum thickness Tmax, pushes the upper end 63U (corresponding to the prior art). Even if the above pushing motion generates an inward and downward rotation moment in the ilium 63, such rotation moment is smaller than that in the case where the upper end 63U of the ilium 63 is pushed by the part A.

Particularly, in the present embodiment, the inner joint portion 56 is provided in the airbag 50 such that the lower edge 56L is slightly lower than and in the vicinity of the side of the upper end 63U of the ilium 63. At the inner joint portion 56, the fabric sheets 51, 52 on the vehicle inner side and the vehicle outer side are joined to each other after being brought close to each other, that is, after being caused to contact each other. The thickness T of the inner joint portion 56 in the vehicle widthwise direction is the minimum thickness Tmin in the airbag 50. Therefore, the thickness T of the airbag 50 in the vehicle widthwise direction is the minimum thickness Tmin at a position beside the upper end 63U of the ilium 63. In this manner, the thickness T of the airbag 50 is smaller than the maximum thickness Tmax in a part beside the upper end 63U of the ilium 63. This is not only because the position is above and away from the part A, at which the thickness T of the lumbar region protecting portion 54 in the vehicle widthwise direction is the maximum thickness Tmax. Another reason is that the thickness T is positively set to the minimum thickness Tmin by providing the inner joint portion 56. Accordingly, the upper end 63U of the ilium 63 is pushed by a part at which the thickness T in the vehicle widthwise direction is the minimum thickness Tmin, and a rotation moment is hardly generated in the ilium 63.

On the side of the human body, the impact resistance of the thorax PT and the abdomen PB is lower than most of the lumbar region PP. Therefore, if the entire upper region protecting portion 55 is inflated in the same manner as the above described lumbar region protecting portion 54 beside the thorax PT and the abdomen PB, the thorax PT and the abdomen PB are pushed with a great load by the upper region protecting portion 55.

In this regard, the part surrounded by the inner joint portion 56 in the airbag 50 of the present embodiment is set as the non-inflation portion 57, and the thickness T of this part in the vehicle widthwise direction is set to the minimum thickness in the airbag 50. The non-inflation portion 57 is deployed not only beside the upper end 63U of the ilium 63, but also, beside the abdomen PB and the thorax PT of the occupant P. Therefore, not only the upper end 63U of the ilium 63, but also the thorax PT and the abdomen PB receive a small load from the non-inflation portion 57.

Also, the space between the body side portion 11 and the thorax PT and the abdomen PB is narrow. Therefore, if the upper region protecting portion 55 is a type that is inflated as a whole and has a large thickness T in the vehicle widthwise direction, it is difficult to deploy and inflate the upper region protecting portion 55 in the narrow space at the same time. However, in the present embodiment, the non-inflation portion 57, which occupies a most part of the upper region protecting portion 55, is not inflated. Thus, the upper region protecting portion 55 is relatively easily deployed in the narrow space.

The first embodiment as described above has the following advantages.

(1) The position in the vertical direction of the part A of the lumbar region protecting portion 54 where the thickness T in the vehicle widthwise direction is the maximum thickness Tmax is below the highest point B of the seat cushion 13 that is located in the front portion. Therefore, a section of the pelvis 61 that is below the upper end 63U of the ilium 63 on the vehicle outer side and has a relatively high impact resistance is protected by the lumbar region protecting portion 54, which is inflated and deployed, from the impact of a side collision.

Also, the upper end 63U of the ilium 63 on the vehicle outer side is pushed by a part of the lumbar region protecting portion 54 the thickness T of which is smaller than that of the part A, or the maximum thickness Tmax. This reduces the inward and downward rotation moment generated in the ilium 63, and thus prevents an excessive load from concentrating on the pubis 65.

In this manner, it is possible to prevent an excessive load from being concentrated on the pubis 65, while protecting the lumbar region PP of the occupant P with the lumbar region protecting portion 54.

(2) The airbag 50 has the upper region protecting portion 55 located above the lumbar region protecting portion 54. Accordingly, the region of the occupant P to be protected by the airbag 50 is extended above the lumbar region PP. The upper region protecting portion 55 is therefore capable of protecting from the impact of a side collision not only the lumbar region PP (except for the upper end 63U of the ilium 63), but also, a portion above the lumbar region PP (including the upper end 63U of the ilium 63).

(3) In the upper region protecting portion 55, the thickness T in the vehicle widthwise direction of the part corresponding to the upper end 63U of the ilium 63 is smaller than that of the part A of the lumbar region protecting portion 54. Therefore, in the airbag 50 having the upper region protecting portion 55, the upper region protecting portion 55 is set at a part at which the thickness T is smaller than the part A of the lumbar region protecting portion 54, at which the thickness in the vehicle widthwise direction is the maximum thickness Tmax. Thus, it is possible to push the upper end 63U of the ilium 63 with this part.

(4) In the upper region protecting portion 55, the thickness T of the airbag 50 in the vehicle widthwise direction is the minimum thickness Tmin at a position corresponding to the upper end 63U of the ilium 63. Therefore, the upper end 63U of the ilium 63 is pushed by a part at which the thickness T in the vehicle widthwise direction is the minimum width Tmin. Accordingly, it is possible to suppress the generation of a rotation moment in the ilium 63 and prevent an excessive load from being concentrated on the pubis 65.

(5) In the airbag 50 having the fabric sheets 51, 52 on the vehicle inner and outer sides, the loop inner joint portion 56 is provided in the upper region protecting portion 55. Also, a part between the fabric sheets 51, 52 surrounded by the inner joint portion 56 is set as the non-inflation portion 57.

The non-inflation portion 57 is formed by providing the loop inner joint portion 56 that joins the fabric sheets 51, 52 to each other after bringing them close to each other. In this manner, by the simple structure of forming the non-inflation portion 57, the thickness T in the vehicle widthwise direction of a part in the upper region protecting portion 55 that corresponds to the upper end 63U of the ilium 63 is the minimum thickness Tmin in the airbag 50.

(6) The non-inflation portion 57 is deployed beside a region ranging from the upper end 63U of the ilium 63 to the abdomen PB and the thorax PT. Therefore, the load applied by the airbag 50 can be reduced not only in the upper end 63U of the ilium 63, but also in the abdomen PB and the thorax PT.

(7) In connection with item (6) above, the non-inflation portion 57 is formed to have such a size that it covers, when deployed, a region ranging from the upper end 63U of the ilium 63 to the abdomen PB and the thorax PT. Therefore, if the position in the vertical direction of the upper end 63U of the ilium 63 varies in accordance with the body size of the occupant P seated in the vehicle seat 12, a part of the airbag 50 where the thickness T in the vehicle widthwise direction is small, preferably, a part where the thickness T is the minimum thickness Tmin is located beside the upper end 63U of the ilium 63.

Second Embodiment

A side airbag apparatus according to a second embodiment of the present invention will now be described.

In the present embodiment, as shown in FIG. 8, instead of the highest point B in the front portion of the seat cushion 13, the upper end C of the buckle 33 of the seat belt apparatus 30 is used as the reference for setting the position in the vertical direction of the part A. The upper end C is at a position slightly lower than the point B in the front portion of the seat cushion 13. In the present embodiment, various factors, including the shape, of the airbag 50 are determined such that the part A is located at a lower position than the upper end C. As described above, the part A is a part of the lumbar region protecting portion 54 where the thickness T in the vehicle widthwise direction is the greatest, and is located at the middle between the inner joint portion 56 and the peripheral joint portion 53.

When setting the position in the vertical direction of the part A, the buckle 33 is assumed to be in the state where the occupant P is seated in the vehicle seat 12 and uses the seat belt apparatus 30 (fastens the seat belt). In this state, the position in the vertical direction of the upper end C is determined. Thus, even though the position in the vertical direction of the upper end C varies in accordance with the body size of the occupant P, it is possible to set the position in the vertical direction of the part A such that the upper end C is located higher than the part A. In this case, as long as the body size of the occupant P is not excessively great or small, that is, as long as the body size difference is within an average range (error margin), the upper end C is located above the part A. Other than these differences, the configuration is the same as the first embodiment.

The position in the vertical direction of the part A of the lumbar region protecting portion 54 is set to be lower than the new reference. Compared to the case where the point B of the seat cushion 13 is used as the reference, the part A is capable of pushing the lumbar region PP of the occupant P at a position spaced further downward from the upper end 63U of the ilium 63. In other words, compared to the case where the point B of the seat cushion 13 is used as the reference, it is possible to push the upper end 63U of the ilium 63 with a part of the lumbar region protecting portion 54 where the thickness T in the vehicle widthwise direction is smaller.

Thus, the second embodiment has the following advantage in addition to the advantages (1) to (7).

(8) The position in the vertical direction of the part A of the lumbar region protecting portion 54 where the thickness T in the vehicle widthwise direction is the maximum thickness Tmax is set lower than the upper end C of the buckle 33 of the seat belt apparatus 30. Compared to the case where the part A is set to be lower than the point B of the seat cushion 13, rotation moment caused by pushing is reduced, so that an excessive load is reliably prevented from being concentrated on the pubis 65.

Third Embodiment

A side airbag apparatus according to a third embodiment of the present invention will now be described.

In the present embodiment, a reference position is a position different from the highest point B in the front portion of the seat cushion 13 and the upper end C of the buckle 33 in the seat belt apparatus 30. Specifically, the upper end 63U of the ilium 63 of the occupant P is set as the reference used for setting the position in the vertical direction of the part A at which the thickness in the vehicle widthwise direction of the lumbar region protecting portion 54 is the maximum thickness Tmax. In the present embodiment, various factors, including the shape, of the airbag 50 are determined such that the part A is located at a lower position than the upper end 63U of the ilium 63 of the occupant P. Other than these differences, the configuration is the same as the first and second embodiments.

The position in the vertical direction of the part A of the lumbar region protecting portion 54 is set lower than the upper end 63U of the ilium 63 of the occupant P. This allows a part of the lumbar region PP that is located lower than the upper end 63U of the ilium 63 to be reliably pushed with the part A of the lumbar region protecting portion 54.

Also, the upper end 63U of the ilium 63 on the vehicle outer side is reliably pushed by a part of the lumbar region protecting portion 54 the thickness T of which is smaller than the part A. Therefore, the force that pushes the upper end 63U of the ilium 63 reliably becomes smaller than that in the case where the part A, at which the thickness T is the maximum thickness Tmax, pushes the upper end 63U.

Thus, the third embodiment has the following advantage in addition to the advantages (1) to (8).

(9) The position in the vertical direction of the part A of the lumbar region protecting portion 54 where the thickness T in the vehicle widthwise direction is the maximum thickness Tmax is set lower than the upper end 63U of the ilium 63 of the occupant P. Thus, compared to the case where the part A is set to be lower than the point B of the seat cushion 13 or the upper end C of the buckle 33, rotation moment caused by pushing is reduced. As a result, an excessive load is reliably prevented from being concentrated on the pubis 65.

Fourth Embodiment

A side airbag apparatus according to a fourth embodiment of the present invention will now be described with reference to FIGS. 11 to 16. The fourth embodiment is different from the first to third embodiment mainly in that the vehicle seat in which the side airbag apparatus is incorporated forms the backseat and that the airbag is designed for a backseat. These differences of the fourth embodiment will be mainly discussed below.

Figure 11:
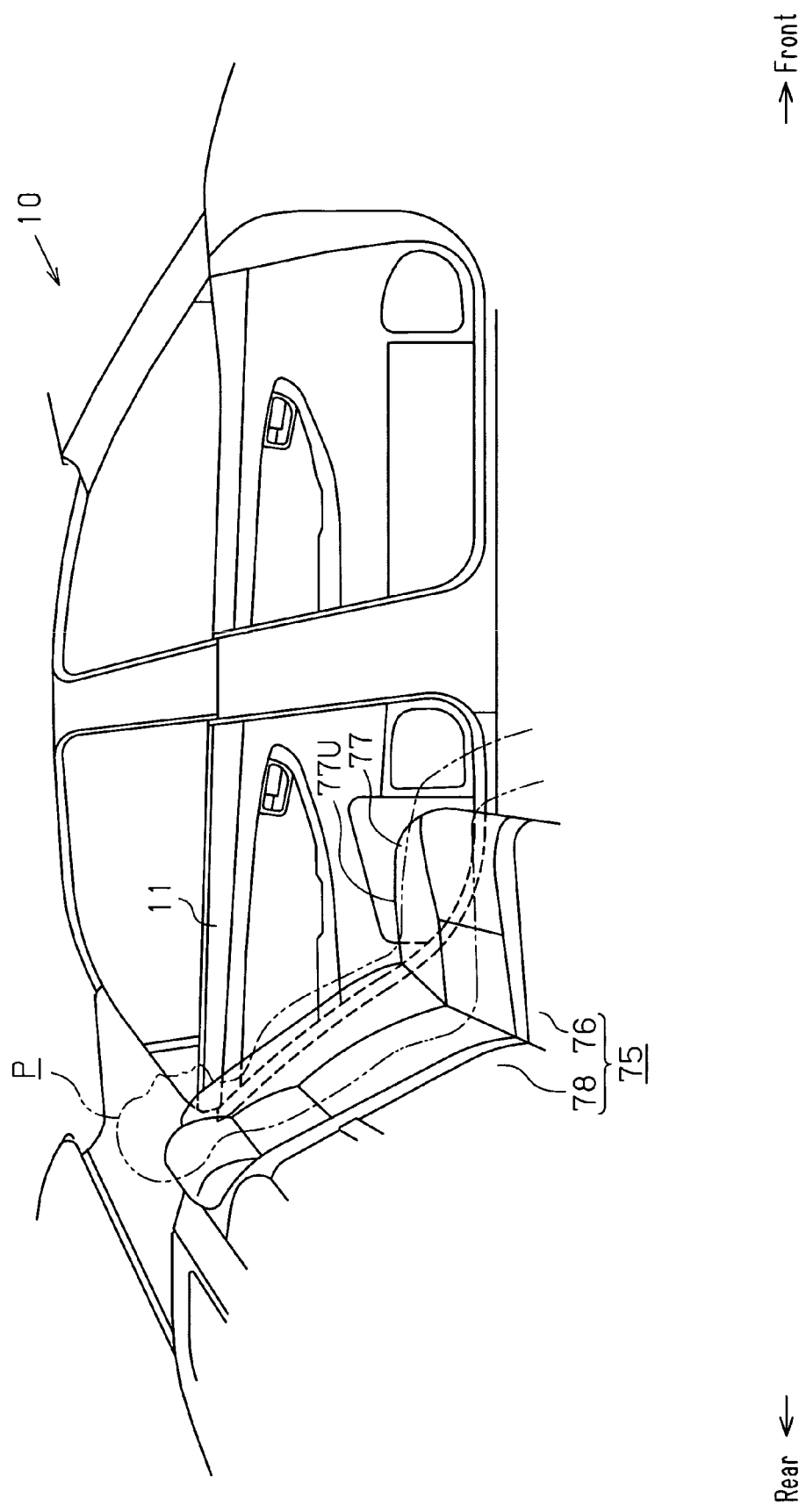
FIG. 11 is a partial perspective view of the vehicle interior as viewed from a side, illustrating a side airbag apparatus for a backseat according to a fourth embodiment of the present invention.
Figure 12:
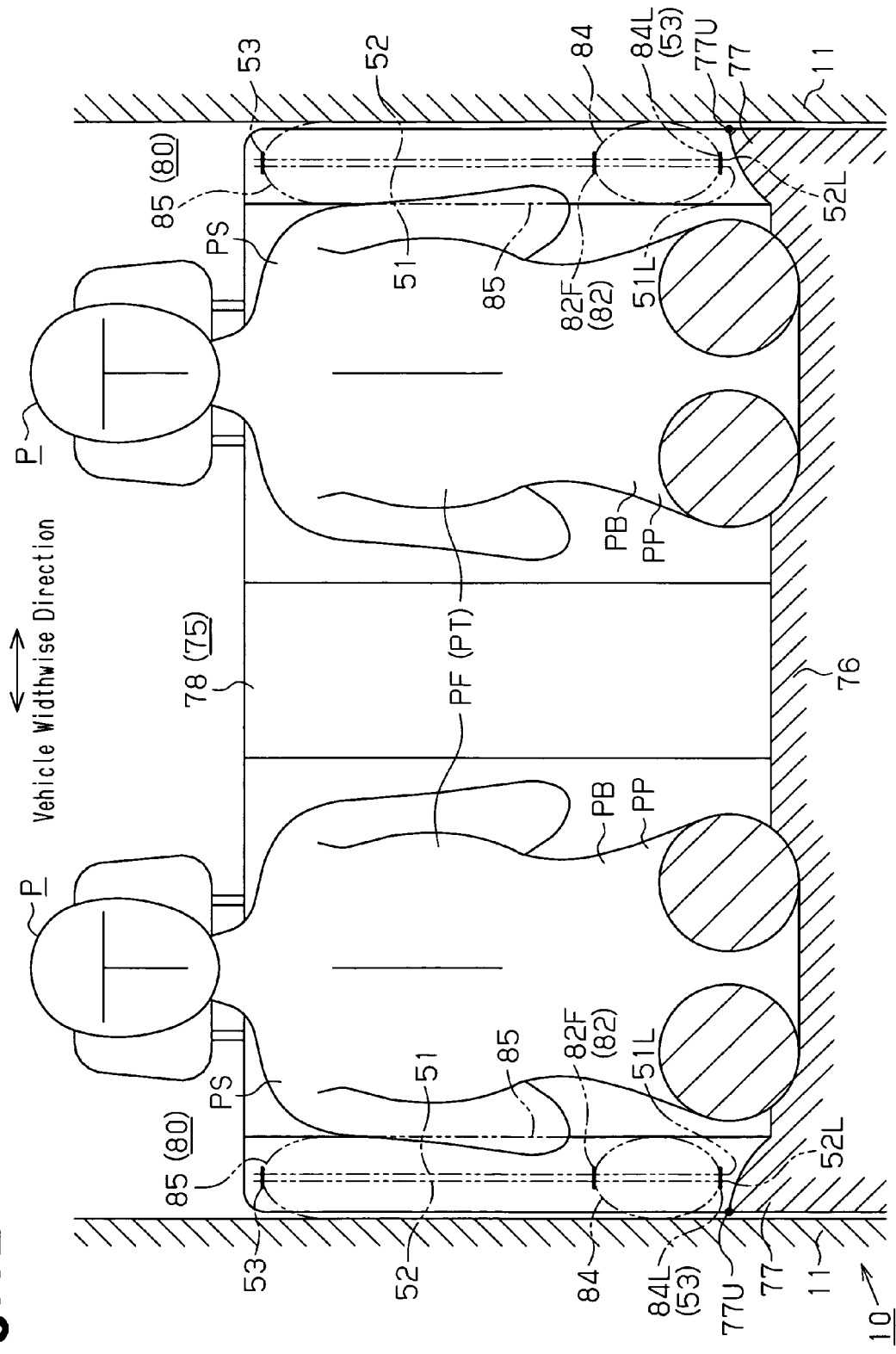
FIG. 12 is a cross-sectional front view showing, together with occupants and airbags, the positional relationship between the vehicle seat and the body side portions of the fourth embodiment.

As shown in FIGS. 11 and 12, a vehicle seat 75 forming the backseat is arranged closer to the body side portion 11 than the vehicle seat 12 forming the front seat (refer to FIG. 2). The clearance between the seat cushion 76 of the backseat and the body side portion 11 is narrower than the clearance between the seat cushion 13 of the front seat and the body side portion 11. It is difficult for an airbag 80 (a lumbar region protecting portion 84) to be inflated and deployed in the narrow clearance. In the vehicle seat 75 forming the backseat, a side portion 77 on each vehicle outer side of the seat cushion 76 is raised.

Figure 14:
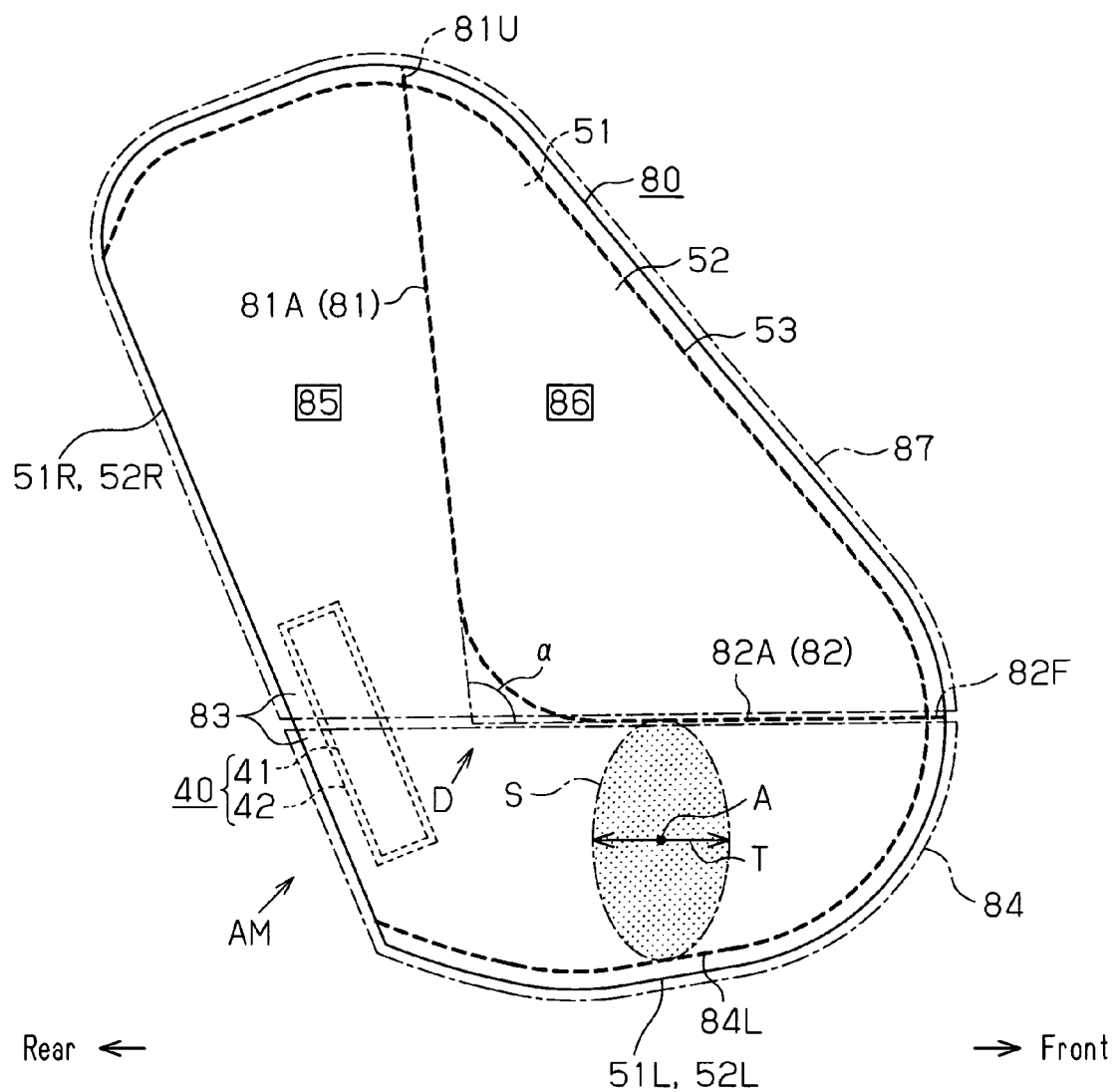
FIG. 14 is a side view illustrating the airbag module with the airbag spread in the fourth embodiment.

As shown in FIGS. 12 and 14, the airbag 80 is formed by a single fabric sheet. The single fabric sheet is folded in half at the center to overlap with itself, and the peripheries of the overlapped portions are joined. To distinguish the two fabric sheets, one of the fabric sheets located on the vehicle inner side is defied as a fabric sheet 51, and the other fabric sheet located on the vehicle outer side is defined as a fabric sheet 52 as in the first to third embodiments. The airbag 80 is arranged such that rear edges 51R, 52R of the fabric sheets 51, 52 are located at the rear end.

The fabric sheets 51, 52 are joined to each other at a peripheral joint portion 53 located at the periphery except for the rear edges 51R, 52R. In the present embodiment, the peripheral joint portion 53 is formed by sewing the peripheries of the fabric sheets 51, 52 together with sewing threads.

Figure 13:
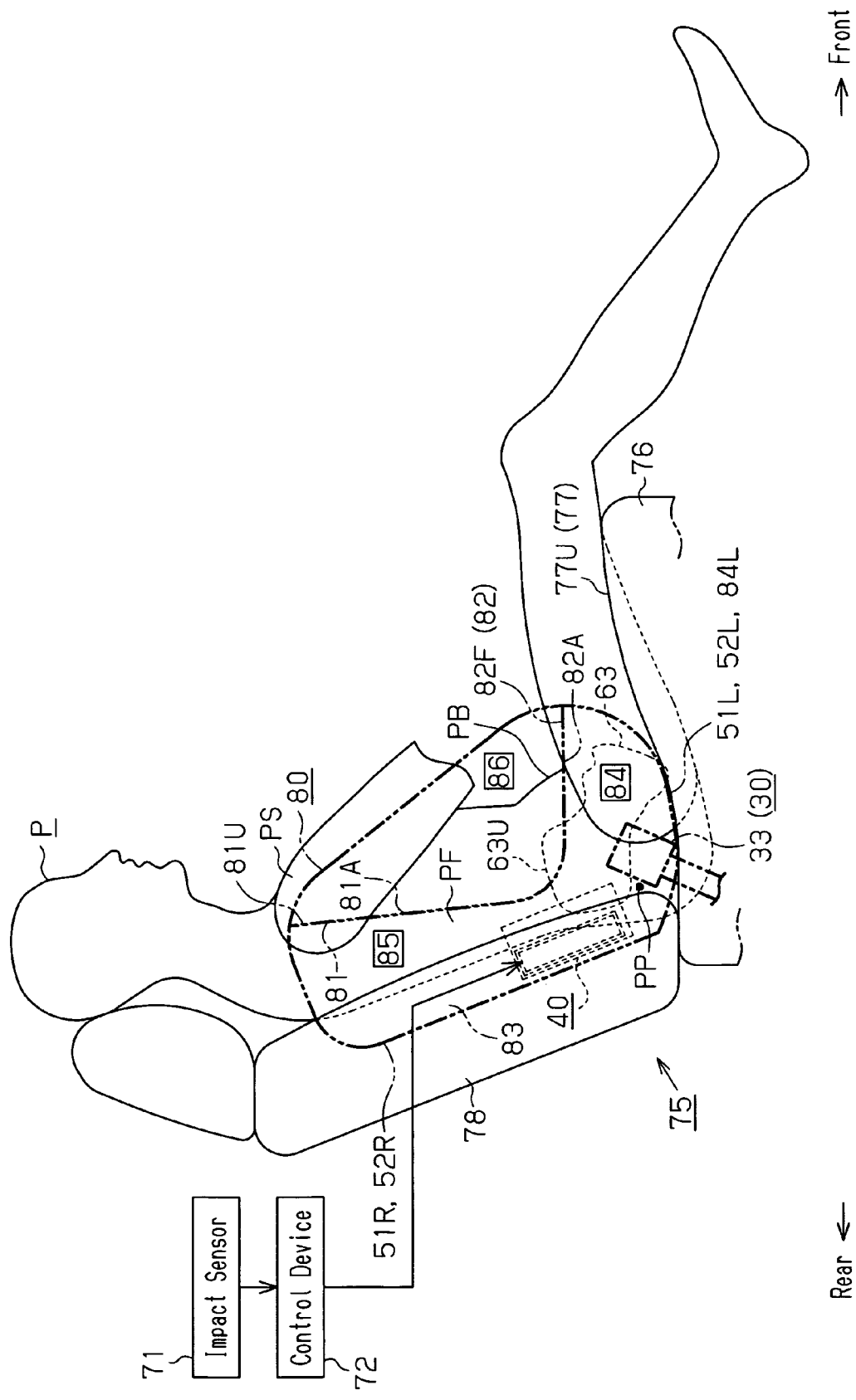
FIG. 13 is a side view illustrating, together with an occupant and an airbag, the vehicle seat forming the backseat equipped with the side airbag apparatuses according to the fourth embodiment of the present invention.

As shown in FIGS. 12 to 14, the fabric sheets 51, 52 have a vertical joint portion 81 and a lateral joint portion 82. The vertical joint portion 81 is formed by bringing the fabric sheets 51, 52 close to each other, that is, causing the fabric sheets 51, 52 to contact each other at a position spaced forward from the rear edges 51R, 52R. Also, the lateral joint portion 82 is formed by bringing the fabric sheets 51, 52 close to each other, that is, causing the fabric sheets 51, 52 to contact each other at a position spaced upward from lower edges 51L, 52L of the fabric sheets 51, 52.

The lateral joint portion 82 is located at a position that is slightly lower than and in the vicinity of the side of the upper end 63U of the ilium 63 in the pelvis 61 of the occupant P when the airbag 80 is inflated and deployed. In the present embodiment, the vertical joint portion 81 and the lateral joint portion 82 are formed by sewing the fabric sheets 51, 52 together with sewing threads.

An upper end 81U of the vertical joint portion 81 intersects the upper end of the peripheral joint portion 53. A front end 82F of the lateral joint portion 82 intersects the front end of the peripheral joint portion 53. The lower end of the vertical joint portion 81 and the rear end of the lateral joint portion 82 are connected to each other, while being gradually curved.

The vertical joint portion 81 has at least in a part thereof a straight section 81A that extends along the front surface of a backrest 78 of the vehicle seat 75. Also, the lateral joint portion 82 has at least in a part thereof a straight section 82A that extends along the upper surface of the seat cushion 76, or along the seating surface. Extending along the backrest 78 or the seat cushion 76 refers not only to a case where something extends parallel to the backrest 78 or the seat cushion 76, but also a case where something extends in a slightly inclined manner relative to the backrest 78 of the seat cushion 76. A downward extension of the straight section 81A of the vertical joint portion 81 and a rearward extension of the straight section 82A of the lateral joint portion 82 intersect each other. The angle α at which the extensions of the straight sections 81A, 82A intersect is an obtuse angle ($\alpha > 90°$) in the present embodiment.

The peripheral joint portion 53, the vertical joint portion 81, and the lateral joint portion 82, which are formed by sewing, are shown by thick broken lines as in the first to third embodiments. The peripheral joint portion 53, the vertical joint portion 81, and the lateral joint portion 82 may be formed by a method other than sewing using sewing threads as shown above, but may be formed by, for example, using an adhesive.

The space between the fabric sheets 51, 52 is divided into an inflation portion 83 and a non-inflation portion 86 by the peripheral joint portion 53, the vertical joint portion 81, and the lateral joint portion 82. The inflation portion 83 is inflated by inflation gas supplied by the inflator assembly 40 and includes a lumbar region protecting portion 84 and a flank protecting portion 85. The non-inflation portion 86 does not receive inflation gas form the inflator assembly 40 and thus is not inflated.

The lumbar region protecting portion 84 is a region between the fabric sheets 51 and 52 below the lateral joint portion 82. More specifically, the lumbar region protecting portion 84 is a region between the lateral joint portion 82 and the lower end of the peripheral joint portion 53. The lumbar region protecting portion 84 is inflated and deployed beside a most part of the lumbar region PP of the occupant P, and protects most part of the lumbar region PP from the impact, for example, of a side collision. The most part of the lumbar region PP refers to a part of the lumbar region PP that is located lower than the upper end 63U of the ilium 63. The flank protecting portion 85 is a region between the fabric sheets 51 and 52 rearward of the vertical joint portion 81. More specifically, the flank protecting portion 85 is a region between the rear edges 51R, 52R and the vertical joint portion 81. The flank protecting portion 85 is inflated and deployed beside the flank PF and the shoulder PS of the occupant P. The inflator assembly 40 is arranged at the boundary between the lumbar region protecting portion 84 and the flank protecting portion 85, while being arranged in the lumbar region protecting portion 84 with the gas outlet of the inflator 41 located at the bottom.

Figure 15:
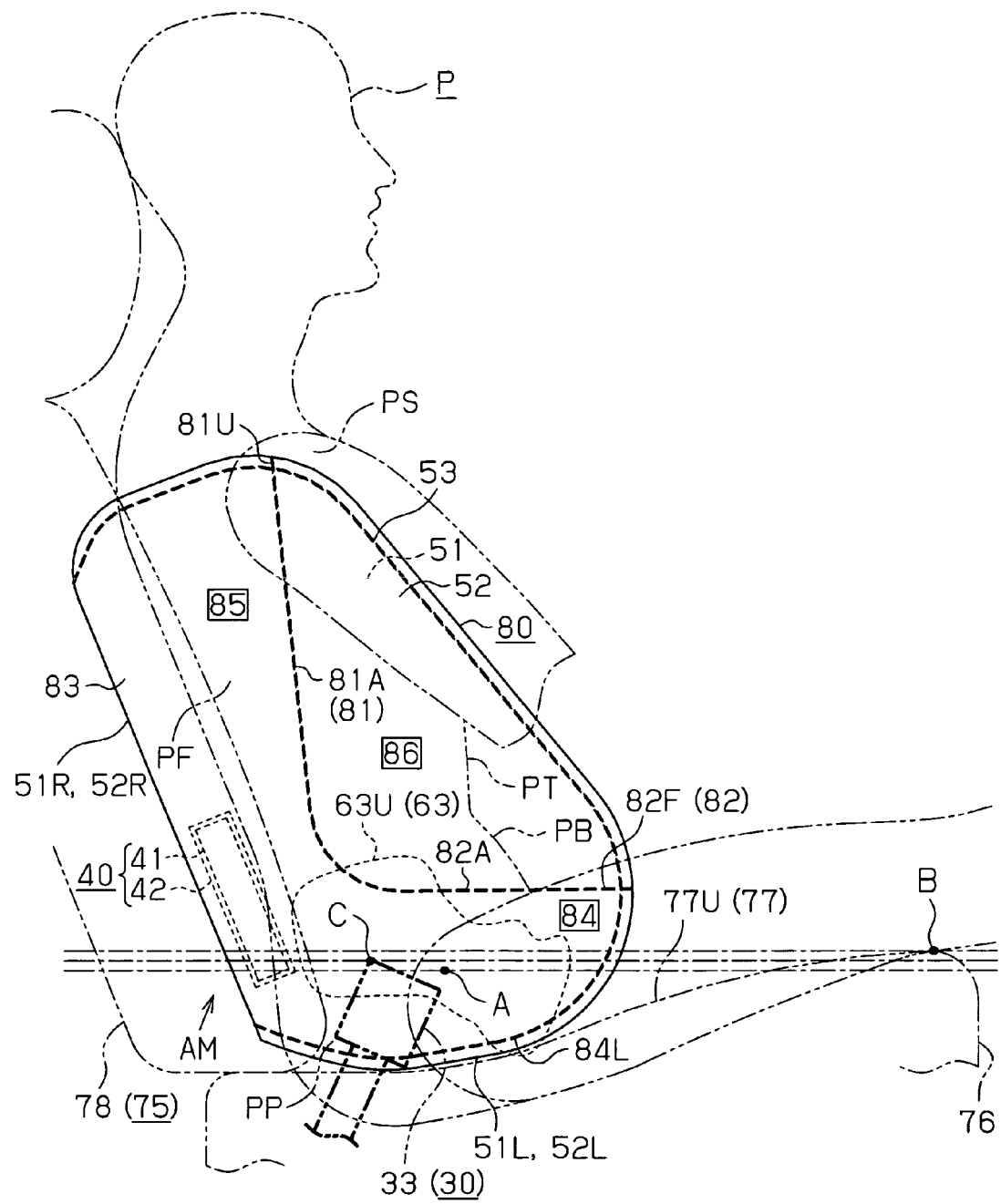
FIG. 15 is a side view illustrating, together with the vehicle seat, the occupant, and the buckle, the airbag module with the airbag spread in the fourth embodiment.
Figure 16A:
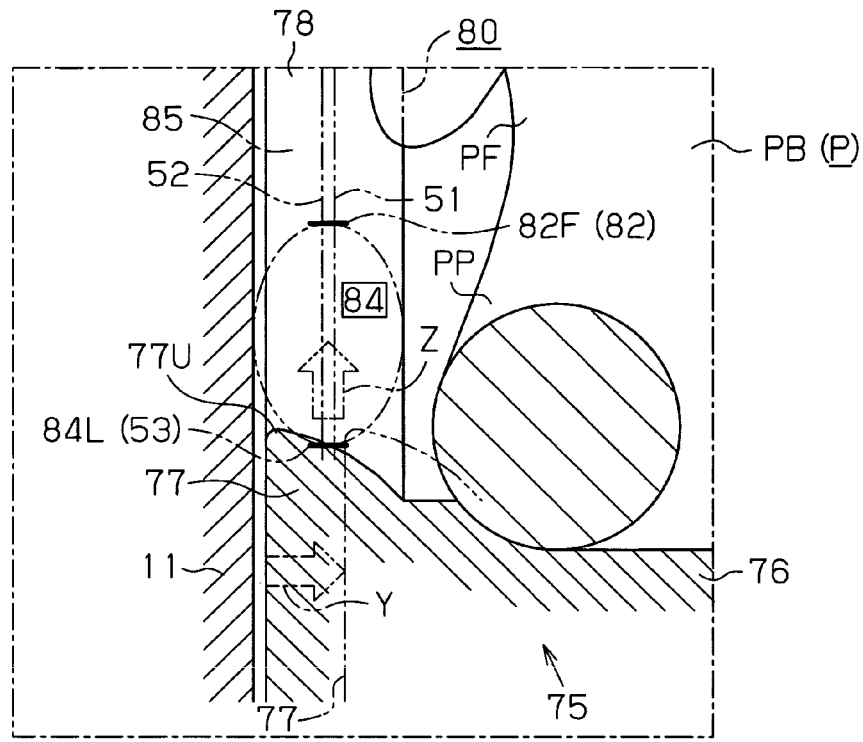
FIG. 16(A) is a partial cross-sectional front view showing a state in which the lumbar region protecting portion of the airbag contacts and is pushed up by a side portion of the backrest.
Figure 16B:
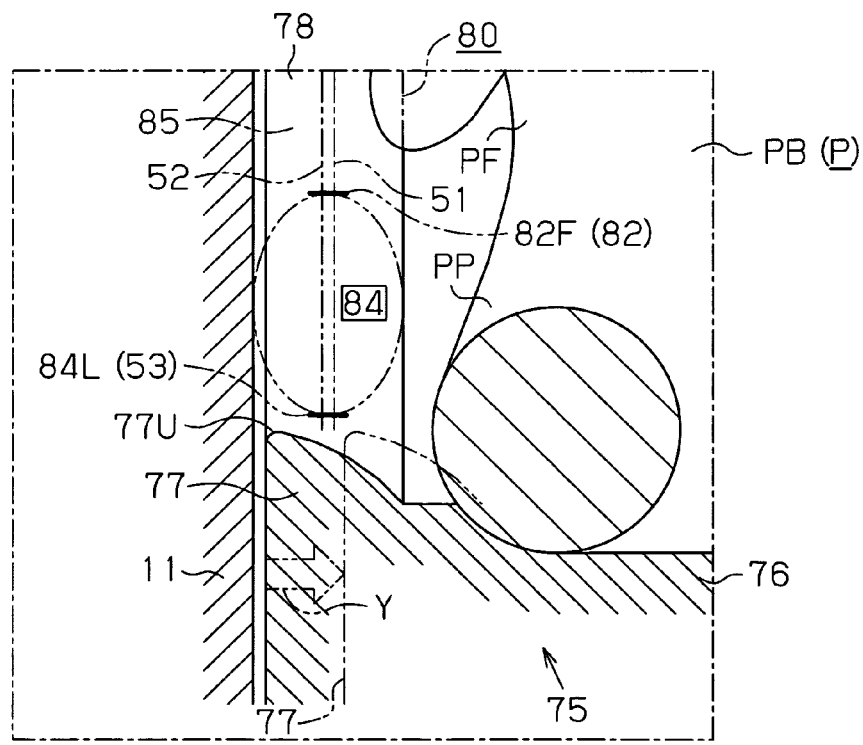
FIG. 16(B) is a partial cross-sectional front view showing a state in which the lumbar region protecting portion does not contact the side portion of the backrest.

As shown in FIGS. 15 and 16(B), a lower edge 84L of the lumbar region protecting portion 84 is formed to have such a shape that, when the lumbar region protecting portion 84 is inflated and deployed, conforms to an upper edge 77U of a vehicle outer side portion 77 of the seat cushion 76, at a position above and near the side portion 77. The lower edge 84L refers to a lower edge of a part of the fabric sheets 51, 52 that is involved in the inflation. Therefore, a portion at which the fabric sheets 51, 52 are joined to each other, that is, the lower end of the peripheral joint portion 53 corresponds to the lower edge 84L of the lumbar region protecting portion 84. The space between the lower edge 84L and the upper edge 77U is significantly small and constant regardless of the position in the front-rear direction of the lumbar region protecting portion 84.

Further, as shown in FIGS. 14 and 15, the non-inflation portion 86, to which inflation gas is not supplied, is a region between the fabric sheets 51, 52 and between the vertical joint portion 81 and the lateral joint portion 82. That is, the non-inflation portion 86 is formed by parts of the fabric sheets 51, 52. A part of the non-inflation portion 86 is deployed beside the upper end 63U of the ilium 63, as a part having the smallest value of the thickness T of n the airbag 80 in the vehicle widthwise direction (refer to FIG. 15). The thickness of the non-inflation portion 86 is substantially zero.

In the airbag 80, the non-inflation portion 86 and the flank protecting portion 85 function as an upper region protecting portion (FIG. 14). The upper region protecting portion 87 ranges from the side of a part of the lumbar region PP of the occupant to a part above the lumber region PP and protects the lumbar region PP and the part above the lumbar region PP from the impact of a side collision. The flank protecting portion 85 is deployed while being inflated, while the non-inflation portion 86 is deployed without being inflated. A part that is above the lumbar region PP refers to the abdomen PB (including the flank PF) and the thorax PT of the occupant P. In FIG. 14, the lumbar region protecting portion 84 and the upper region protecting portion 87 are shown by frames depicted with alternate long and short dash lines.

When supplied with inflation gas, the inflation portion 83, that is, the lumbar region protecting portion 84 and the flank protecting portion 85, are inflated to have a round shape. The thickness T in the vehicle widthwise direction of the lumbar region protecting portion 84 in the inflation portion 83 is the minimum thickness Tmin at the lateral joint portion 82 and the peripheral joint portion 53, at which the fabric sheets 51, 52 are joined to each other. The thickness T of the lumbar region protecting portion 84 increases as the distance from the lateral joint portion 82 increases and as the distance from the peripheral joint portion 53 increases. The thickness T of the lumbar region protecting portion 84 is the maximum thickness Tmax at the middle between the lateral joint portion 82 and the peripheral joint portion 53.

In FIG. 14, a part shown by halftone dots represents the cross section S of the lumbar region protecting portion 84 in an inflated state. For purposes of illustration, the cross section S is illustrated as a vertically long ellipse. The thickness T in the vehicle widthwise direction of the lumbar region protecting portion 84 is shown by a straight line with an arrow at either end in the cross section S.

Various factors, including the shape, of the airbag 80 are determined such that, in the lumbar region protecting portion 84, the part A, at which the thickness T in the vehicle widthwise direction is the maximum thickness Tmax, is located at a lower position than the highest point B in a front portion of the seat cushion 13 and than the lower end C of the buckle 33 of the seat belt apparatus 30. As described above, the point B is spaced downward from the upper end 63U of the ilium 63. The upper end C is spaced further downward from the upper end 63U of the ilium 63 than the point B.

Other than these differences, the configuration is the same as the first to third second embodiments. Therefore, like or the same reference numerals are given to those components that are like or the same as the corresponding components of the first to third embodiments and detailed explanations are omitted.

In the side airbag apparatus having the above described configuration, when an impact is applied to the vehicle 10 from a side due to a side collision, the inflator assembly 40 supplies inflation gas to the inflation portion 83 (the lumbar region protecting portion 84 and the flank protecting portion 85). The inflation gas causes the airbag 80 to be inflated and deployed so that the airbag 80 pops out from the backrest 14 with a part remaining in the backrest 14.

Thereafter, the airbag 80 is deployed toward the front of the vehicle 10 in a space between the occupant P and the body side portion 11, which is bulging into the passenger compartment. At this time, the inflation portion 83 of the airbag 80 is deployed while being inflated, and the non-inflation portion 86 is deployed without being inflated. Since the gas outlet of the inflator 41 is located in the lumbar region protecting portion 84, the inflation gas is supplied preferentially to the lumbar region protecting portion 84 rather than the flank protecting portion 85. Therefore, in the inflation portion 83, the lumbar region protecting portion 84 starts inflation and deployment at an earlier stage than the flank protecting portion 85.

The lumbar region protecting portion 84 is deployed while being inflated on one side of most part of the occupant's lumbar region PP. The most part of the lumbar region PP of the occupant P refers to a part excluding a spot that corresponds to the upper end 63U of the ilium 63. The lumbar region protecting portion 84 reduces the impact of the side collision transmitted to the most part of the lumbar region PP through the body side portion 11.

Beside a part of the lumbar region PP and beside the abdomen PB (including the flank portion PF) and thorax PT, an upper portion of the inflation portion 83, that is, the flank protecting portion 85 is deployed while being inflated, and the non-inflation portion 86 is deployed without being inflated. The part of the lumbar region PP refers to a part that corresponds to the upper end 63U of the ilium 63. The flank protecting portion 85 reduces the impact of the side collision transmitted to the flank portion PF through the body side portion 11. Since the non-inflation portion 86 becomes tightly stretched between the lumbar region protecting portion 84 and the flank protecting portion 85, the non-inflation portion 86 prevents the lumbar region protecting portion 84 and the flank protecting portion 85 from separating away from each other, or from being spread.

In the present embodiment, the position in the vertical direction of the part A, where the thickness T of the lumbar region protecting portion 84 in the vehicle widthwise direction is the maximum thickness Tmax, is set lower than the highest point B of the seat cushion 13 that is located in the front portion and than the upper end C of the buckle 33 of the seat belt apparatus 30. Since the part A of the lumbar region protecting portion 84 is set to the above described position in the vertical direction, part of the ilium 63 on the vehicle outer side below the upper end 63U is pushed by the part A of the lumbar region protecting portion 84. The part of the ilium 63 on the vehicle outer side that is below the upper end 63U has a relatively high impact resistance. Thus, no problem will occur if this part is pushed by the part A.

The upper region protecting portion 87 has the non-inflation portion 86. The non-inflation portion 86 is a region that is located between the fabric sheets 51 and 52 and between the vertical joint portion 81 and the lateral joint portion 82. The region has a part that corresponds to the upper end 63U of the ilium 63 of the occupant P. The thickness T of this part is smaller than that of the part A, the thickness T of which is the greatest in the vehicle widthwise direction in the lumbar region protecting portion 84. Therefore, the upper end 63U of the ilium 63 on the vehicle outer side is pushed by a part of the lumbar region protecting portion 84 the thickness T of which is smaller than that of the part A, or the maximum thickness Tmax. The force that pushes the upper end 63U of the ilium 63 is smaller than that in the case where the part A, at which the thickness T is the maximum thickness Tmax, pushes the upper end 63U. Therefore, even if the above pushing motion generates an inward and downward rotation moment in the ilium 63, such rotation moment is smaller than that in the case where the upper end 63U of the ilium 63 is pushed by the part A.

Particularly, in the present embodiment, the lateral joint portion 82 is provided in the airbag 80 so as to be slightly lower than and in the vicinity of the side of the upper end 63U of the ilium 63. At the lateral joint portion 82, the fabric sheets 51, 52 on the vehicle inner side and the vehicle outer side are joined to each other after being brought close to each other, that is, after being caused to contact each other, and the thickness T in the vehicle widthwise direction is the smallest thickness Tmin in the airbag 80. Therefore, the thickness T of the airbag 80 in the vehicle widthwise direction is the minimum thickness Tmin at a position beside the upper end 63U of the ilium 63. In this manner, the thickness T of the airbag 80 is smaller than the maximum thickness Tmax in a part beside the upper end 63U of the ilium 63. This is not only because the position is above and away from the part A, at which the thickness T of the lumbar region protecting portion 84 in the vehicle widthwise direction is the maximum thickness Tmax. Another reason is that the thickness T is positively set to the minimum thickness Tmin by providing the non-inflation portion 86. Accordingly, the upper end 63U of the ilium 63 is pushed by a part at which the thickness T in the vehicle widthwise direction is the minimum thickness Tmin, and a rotation moment is hardly generated in the ilium 63.

The airbag 80 is inflated such that the inflation portion 83 has the largest volume with the smallest surface area. Therefore, if the extensions the straight section 81A of the vertical joint portion 81 and the straight section 82A of the lateral joint portion 82 intersect to define an acute angle ($\alpha<0$), the fabric of the inflation portion 83 in the vicinity of the intersection D is not fully inflated and gets baggy at the inflation and deployment of the airbag 80, forming creases. These excess portions cause a part of the fabric to be free of tension and easily bendable. If the airbag 80 is bent, the protection feature of the lumbar region protecting portion 84 for the lumbar region PP and the protection feature of the flank protecting portion 85 for the flank PF might not be sufficiently exercised.

In this regard, the extensions of the straight sections 81A, 82A intersect at an obtuse angle ($\alpha>90°$) in the present embodiment. This inhibits creases from being formed in the inflation portion 83 in the vicinity of the intersection D, so that the fabric is likely to receive tension. Therefore, the airbag 80 is unlikely to be bent. As a result, the lumbar region protecting portion 84 and the flank protecting portion 85 reliably protect the lumbar region PP and the flank PF, respectively.

The vehicle seat 75, which forms the backseat, is closer to the body side portion 11 than the vehicle seat 12 forming the front seat. The clearance between the seat cushion 76 of the backseat and the body side portion 11 is narrower than the clearance between the seat cushion 13 of the front seat and the body side portion 11. It is thus difficult for an airbag 80 (the lumbar region protecting portion 84) to be inflated and deployed in the narrow clearance. Therefore, in the airbag apparatus of the present embodiment, which is incorporated in the vehicle seat 75 forming the back seat, the airbag 80 (the lumbar region protecting portion 84) is inflated and deployed in a space above the seat cushion 76.

On the other hand, in order to protect the lumbar region PP of the occupant P by inflating and deploying the lumbar region protecting portion 84 beside the lumbar region PP, the volume of the lumbar region protecting portion 84 is preferably as great as possible.

Accordingly, in the present embodiment, when the lumbar region protecting portion 84 is inflated and deployed, the lower edge 84L has a shape that conforms to the upper edge 77U of the vehicle outer side portion 77 of the seat cushion 76 at a position above and in the vicinity of the side portion 77. Therefore, the lumbar region protecting portion 84 has the largest possible volume, and efficiently receives impact from the lumbar region PP.

In the vehicle seat 75 forming the backseat, a side portion 77 on each vehicle outer side of the seat cushion 76 is raised. Assume that the lumbar region protecting portion 84 is inflated and deployed with its lower edge 84L located at a position lower than the upper edge 77U of the vehicle outer side portion 77. If the body side portion 11 bulges into the passenger compartment due to the impact of a side collision, the side portion 77 is pushed toward the inside of the vehicle as shown by arrow Y in FIG. 16(A). When the side portion 77 moves in the direction of arrow Y, the lumbar region protecting portion 84 is pushed up by the side portion 77 as shown by arrow Z in FIG. 16(A), so as to be urged upward. When the urging motion raises the lower edge 84L of the lumbar region protecting portion 84 above the upper edge 77U of the side portion 77, the protection feature of the lumbar region protecting portion 84 for the lumbar region PP may not be sufficiently exercised.

However, in the present embodiment, when the lumbar region protecting portion 84 is inflated and deployed, its lower edge 84L is located above and in the vicinity of the side portion 77 on the vehicle outer side of the seat cushion 76 as shown in FIG. 16(B). The lower edge 84L is slightly spaced upward from the upper edge 77U of the side portion 77. Therefore, even if the inward bulging of the body side portion 11 pushes the side portion 77 inward as shown by arrow Y in FIG. 16(B), the lumbar region protecting portion 84 is neither pushed upward nor urged upward by the side portion 77. The position in the vertical direction of the lumbar region PP remains unchanged before and after the inward movement of the side portion 77. As a result, the lumbar region protecting portion 84 reliably protects the lumbar region PP.

Thus, the fourth embodiment has the following advantages in addition to the advantages (1) to (4), (8), and (9).

(10) In the airbag 80 having the inner and outer fabric sheets 51, 52, the fabric sheets 51, 52 are joined at the vertical joint portion 81 and the lateral joint portion 82 after being brought close to each other. The part having the smallest thickness T in the vehicle widthwise direction is located in a region between the fabric sheets 51, 52 and between the vertical joint portion 81 and the lateral joint portion 82 (FIGS. 14 and 15). Thus, the upper end 63U of the ilium 63 is pushed by a part of the lumbar region protecting portion 84 the thickness T of which is smaller than the part A, where the thickness T in the vehicle widthwise direction is the greatest.

(11) The non-inflation portion 86, which is formed by at a part of each of the fabric sheets 51, 52, is provided in a region between the fabric sheets 51, 52 and between the vertical joint portion 81 and the lateral joint portion 82. In this manner, by the simple structure, the thickness T in the vehicle widthwise direction of a part in the non-inflation portion 86 that corresponds to the upper end 63U of the ilium 63 is the minimum thickness Tmin in the airbag 80. By substantially setting the thickness T to zero, rotation moment is prevented from being generated. This effectively prevents excessive load from being concentrated on the pubis 65.

Also, the non-inflation portion 86 prevents the lumbar region protecting portion 84 and the flank protecting portion 85 from separating from each other, that is, from spreading.

(12) A region between the fabric sheets 51 and 52 that is below the lateral joint portion 82 is set as the lumbar region protecting portion 84. A region between the fabric sheets 51 and 52 behind the vertical joint portion 81 is set as the flank protecting portion 85, which forms a part of the upper region protecting portion 87 (FIGS. 14 and 15).

Therefore, by inflating and deploying the lumbar region protecting portion 84 beside the lumbar region PP of the occupant P, the lumbar region PP can be protected from an impact. Also, by inflating and deploying the flank protecting portion 85 beside the flank PF of the occupant P, the flank PF can be protected from an impact.

(13) At least a part of the vertical joint portion 81 is formed by the straight section 81A extending along the backrest 78. Also, at least a part of the lateral joint portion 82 is formed by the straight section 82A extending along the seat cushion 76. The extensions of the straight sections 81A, 82A intersect at an obtuse angle ($\alpha > 90°$) as shown in FIG. 14.

In a part of the inflation portion 83 in the vicinity of the intersection D, the fabric sheets have tension and the airbag 80 is not easily bent. The lumbar region protecting portion 84 and the flank protecting portion 85 reliably protect the lumbar region PP and the flank PF, respectively.

(14) In the airbag 80 of the side airbag apparatus adapted for the vehicle seat 75 forming a backseat, the lower edge 84L of the lumbar region protecting portion 84 is formed in a position above and in the vicinity of the side portion to conform to the upper edge 77U of the side portion 77 of the seat cushion 76 on the vehicle outer side (FIGS. 15 and 16(B)). It is therefore possible to maximize the volume of the lumbar region protecting portion 84, thereby efficiently protecting the lumbar region PP of the occupant P from an impact.

Even if the inward bulging of the body side portion 11 pushes inward the vehicle outer side portion 77 of the seat cushion 76, the lumbar region protecting portion 84 is neither pushed upward nor urged upward by the side portion 77. Therefore, the lumbar region protecting portion 84 reliably protects the lumbar region PP.

The present invention may be embodied in the following forms.

In the first to third embodiments, the part to be protected by the upper region protecting portion 55 includes the thorax PT and the abdomen PB of the occupant P. Instead, the upper region protecting portion 55 may protect any part that is above the lumbar region PP and includes at least the abdomen PB. For example, the shoulder PS and the head PH may be protected by the upper region protecting portion 55.

The outer shape of the airbag 50 when spread without being filled with inflation gas may be different from those described in the above embodiments.

The shape and size of the inner joint portion 56 when the airbag 50 is spread without being filled with inflation gas may be different from those described in the above embodiments.

When changing the inner joint portion 56 to the minimum size, the inner joint portion 56 is provided, for example, only in a part that is beside the upper end 63U of the ilium 63. In this case, the non-inflation portion 57, which is surrounded by the inner joint portion 56, will be smaller than those in the above described embodiment.

Accordingly, in the upper region protecting portion 55, the thickness T of the airbag 50 in the vehicle widthwise direction is the minimum thickness Tmin at a position corresponding to the upper end 63U of the ilium 63. In this case, the inner joint portion 56, which is a part of the upper region protecting portion 55, and the non-inflation portion 57 are located beside a part corresponding to the upper end 63U of the ilium 63, and the part has the smallest thickness Tmin in the airbag 50. Therefore, the upper end 63U of the ilium 63 is pushed with a part at which the thickness T in the vehicle widthwise direction is the minimum width Tmin, that is, with the non-inflation portion 57. As a result, even in this case, it is possible to suppress the generation of a rotation moment in the ilium 63 and prevent an excessive load from being concentrated on the pubis 65.

In the upper region protecting portion 55, the thickness T in the vehicle widthwise direction of a part that corresponds to the upper end 63U of the ilium 63 is preferably the minimum thickness Tmin as in the above described embodiments. However, in order to prevent load from being concentrated on the pubis 65, the thickness T does not necessarily need to be the minimum thickness Tmin as long as the thickness T in the vehicle widthwise direction of the lumbar region protecting portion 54 is smaller than the maximum thickness Tmax of the part A. Therefore, the inner joint portion 56 may join the inner fabric sheet 51 and the fabric sheet 52 on the vehicle outer side to each other in a state where the fabric sheets 51, 52 are slightly spaced from each other in the upper region protecting portion 55. Such a structure can be achieved by connecting the fabric sheets 51, 52 to each other with a fabric sheet called a tether.

If the above modification is made, the thickness T of a part that corresponds to the upper end 63U of the ilium 63 in the upper region protecting portion 55 is smaller than the maximum thickness Tmax of the lumbar region protecting portion 54 in the vehicle widthwise direction. Therefore, in the airbag 50 having the upper region protecting portion 55, the upper region protecting portion 55 may include a part at which the thickness T is smaller than that of the part A of the lumbar region protecting portion 54, at which the thickness T in the vehicle widthwise direction is the maximum thickness Tmax, so that the upper end 63U of the ilium 63 is pushed with the part.

The upper region protecting portion 55 may be omitted so that the airbag 50 is formed only by the lumbar region protecting portion 54. In this case, the lumbar region protecting portion 54 is formed to have such size and shape that it protects only the lumbar region PP of the occupant P (including the upper end 63U of the ilium 63). The position in the vertical direction of the part A of the lumbar region protecting portion 54 where the thickness T in the vehicle widthwise direction is the maximum thickness Tmax is set to be lower than the point B of the seat cushion 13, the upper end C of the buckle 33, and the upper end 63U of the ilium 63. According to this configuration, beside the upper end 63U of the ilium 63, a part in the vicinity of the upper edge of the lumbar region protecting portion 54, that is, a part where the thickness T in the vehicle widthwise direction is small, is inflated and deployed.

The inflator assembly 40 may be located outside of the airbag 50. In this case, the inflator 41 and the inflation portion 58 of the airbag 50 may be connected to each other with a pipe, so that inflation gas is supplied to the inflation portion 58 from the inflator 41 through the pipe.

Instead of the backrest 14 of the vehicle seat 12, the storage portion 22 may be provided in the body side portion 11. The airbag module AM may be arranged in the storage portion 22.

The lumbar region protecting portion, which is inflated and deployed beside the lumbar region PP of the occupant P to protect the lumbar region PP, is one of the indispensable parts of the airbag. Other parts of the airbag may be changed as necessary.

Figure 17:
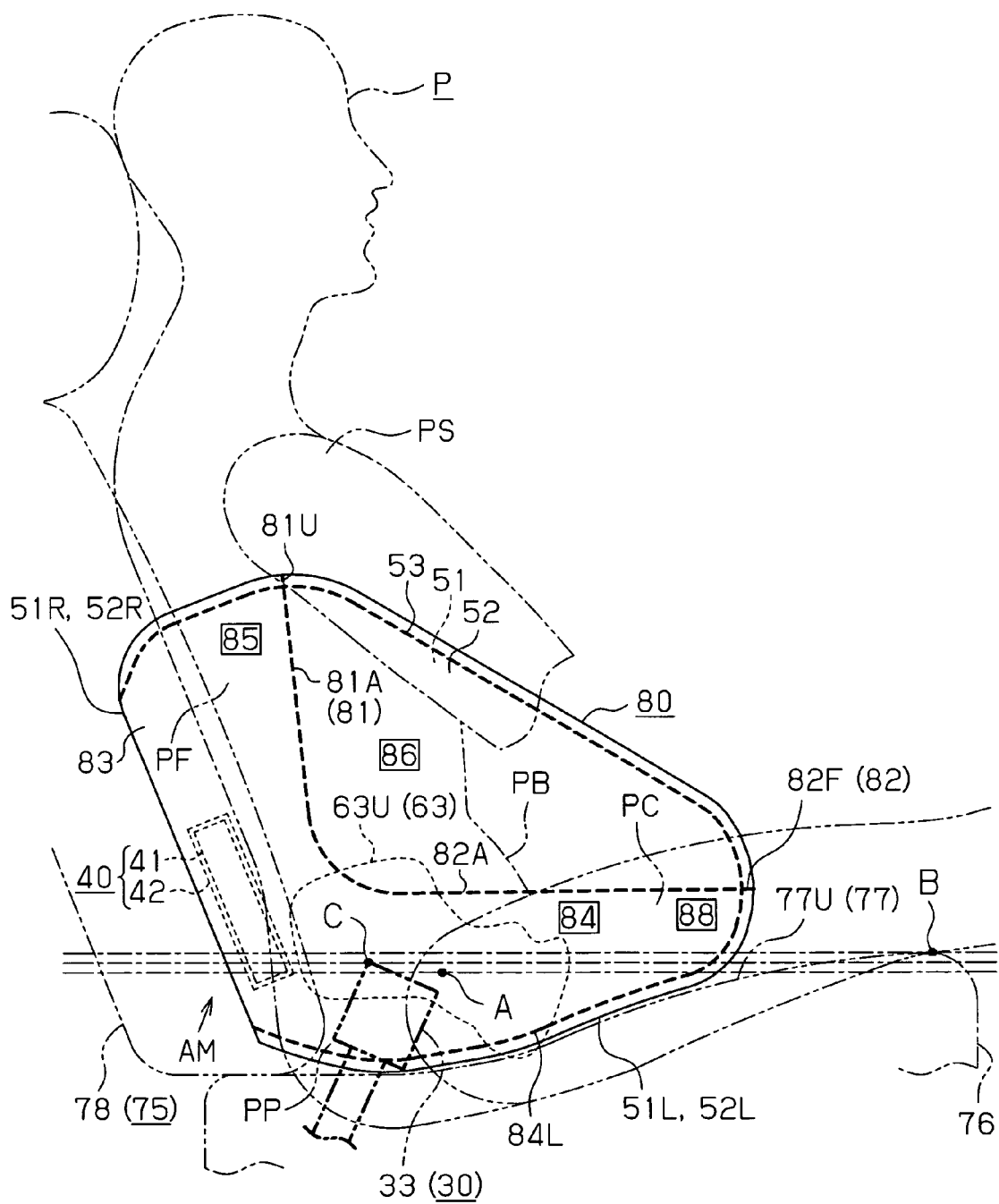
FIG. 17 is a side view illustrating, together with the vehicle seat, the occupant, and the buckle, an airbag module with the airbag spread according to a modification of the fourth embodiment.

For example, in the fourth embodiment, the lumbar region protecting portion 84 may be extended further forward as shown in FIG. 17. The extended portion may be formed as a femoral region protecting portion 88, which is inflated and deployed beside a femoral region PC of the occupant P to protect the femoral region PC. When the lumbar region protecting portion 84 is inflated and deployed beside the lumbar region PP of the occupant P in response to an impact applied to the vehicle 10, the femoral region protecting portion 88 is inflated and deployed beside the femoral region PC, which is forward of the lumbar region PP. It is thus possible to protect the femoral region PC from the impact with the femoral region protecting portion 88, while protecting the lumbar region PP of the occupant from the impact with the lumbar region protecting portion 84.

The upper end of the flank protecting portion 85 may be lower than that in the fourth embodiment and located near the armpit as shown in FIG. 17.

If the upper end of the flank protecting portion 85 is lowered, the volume thereof is reduced. Accordingly, the volume of the femoral region protecting portion 88 may be increased. In this manner, the shape of the inflation portion 83 can be changed while maintaining, that is, without changing the volume of the entire inflation portion 83 of the airbag 80.

In the fourth embodiment, the non-inflation portion 86 is formed by parts of the fabric sheets 51, 52 on the vehicle inner side and the vehicle outer side. Instead, the non-inflation portion 86 may be formed by a part of one of the fabric sheets 51, 52.

In the fourth embodiment, the position in the vertical direction of the part A, at which the thickness T in the vehicle widthwise direction of the lumbar region protecting portion 84 is maximum, needs to meet at least the condition 1 of the following conditions 1 and 2. In this case also, the part A can push the lumbar region PP of the occupant P at a position spaced downward from the upper end 63U of the ilium 63.

Condition 1: The position in the vertical direction of the part A is lower than the highest point B in the front portion of the seat cushion 76.

Condition 2: The position in the vertical direction of the part A is lower than the upper end C of the buckle 33 of the seat belt apparatus.

The vertical joint portion 81 may be changed as long as it has at least in a part there of a straight section 81A that extends along the backrest 78. Therefore, the vertical joint portion 81 may have a straight section 81A only in a part, or may be entirely formed by a straight section 81A.

The lateral joint portion 82 may also be changed as long as it has at least in a part thereof a straight section 82A that extends along the seat cushion 76. Therefore, the lateral joint portion 82 may have a straight section 82A only in a part, or may be entirely formed by a straight section 82A.

The position of the vertical joint portion 81 in the front-rear direction may be shifted forward compared to that of the fourth embodiment. A region of the fabric sheets 51, 52 that is rearward of the vertical joint portion 81 may be inflated and deployed to cover the side of the flank PF of the occupant P and the side of a part forward of the flank PF.

The side airbag apparatuses of the first to third embodiments may be used in a backseat instead of in the front seat of the vehicle 10. If the side airbag apparatus is installed in the backseat, it is preferable that the lower edge of the lumbar region protecting portion 54 be shaped to conform to the upper edge 77U of the side portion 77 in the vicinity of and above the side portion 77 of the seat cushion 76. Further, a femoral region protecting portion may be provided forward of the lumbar region protecting portion 54.

Therefore, the present examples and embodiments are to be considered as illustrative and not restrictive and the invention is not to be limited to the details given herein, but may be modified within the scope and equivalence of the appended claims.

The invention claimed is:

1. A side airbag apparatus mounted on a vehicle having a vehicle seat and a body side portion, the apparatus comprising:

an inflator; and an airbag that is inflated and deployed in a space between an occupant seated in the vehicle seat and the vehicle body side portion by inflation gas that is supplied from the inflator in response to an impact applied to the vehicle from a side, wherein the airbag includes a lumbar region protecting portion that is inflated and deployed at least beside the lumbar region of the occupant, thereby protecting the lumbar region, wherein the vehicle seat includes a seat cushion that is inclined such that the height of the seat cushion in the vertical direction increase toward the front end, and wherein the lumbar region protecting portion has a part at which the thickness in the vehicle widthwise direction is the greatest, the position in the vertical direction of the part being lower than a highest point in a front portion of the seat cushion, and the lowest end position of the airbag when the airbag is inflated and deployed is higher than the lowest position of a seating surface of the vehicle seat.

2. The side airbag apparatus according to claim 1, wherein the vehicle has a seat belt apparatus for restraining an occupant seated in the vehicle seat, and wherein the position in the vertical direction of the part at which the thickness in the vehicle widthwise direction of the lumbar region protecting portion is the greatest is set to be lower than an upper end of a buckle of the seat belt apparatus.

3. The side airbag apparatus according to claim 1, wherein the position in the vertical direction of the part at which the thickness in the vehicle widthwise direction of the lumbar region protecting portion is the greatest is located in the middle section of the lumbar region protection portion.

4. The side airbag apparatus according to claim 1, wherein the airbag includes an upper region protecting portion located at a position higher than the lumbar region protecting portion, and the upper region protecting portion has a part with a smaller thickness in the vehicle widthwise direction than the part at which the thickness in the vehicle widthwise direction of the lumbar region protecting portion is the greatest.

5. The side airbag apparatus according to claim 4, wherein a loop inner joint portion is provided in the upper region protecting portion and arranged adjacent the lumbar region protecting portion, the loop inner joint portion having a smallest thickness in the vehicle widthwise direction of the airbag a.

6. The side airbag apparatus according to claim 5, wherein the airbag includes a fabric sheet on a vehicle inner side and a fabric sheet on a vehicle outer side, wherein the inner joint portion joins the fabric sheets to each other in a state where the fabric sheets are brought close to each other, and wherein a part that is between the fabric sheets and surrounded by the inner joint portion is deployed has a thickness in the vehicle widthwise direction that is a second smallest thickness of the airbag.

7. The side airbag apparatus according to claim 6, wherein the part that is between the fabric sheets and surrounded by the inner joint portion is deployed in the upper region protecting portion.

8. The side airbag apparatus according to claim 4, wherein the airbag includes a fabric sheet on a vehicle inner side and a fabric sheet on a vehicle outer side, wherein the airbag includes:
a vertical joint portion provided in a part that is spaced forward from the rear edge of the fabric sheets, the vertical joint portion joining the fabric sheets to each other in a state where the fabric sheets are brought close to each other; and
a lateral joint portion provided in a part that is spaced upward from the lower edge of the fabric sheets, the lateral joint portion joining the fabric sheets to each other in a state where the fabric sheets are brought close to each other, and
wherein the upper region protecting portion has a part having a small width in the vehicle widthwise direction, the part being located in a region between the fabric sheets and between the vertical joint portion and the lateral joint portion.

9. The side airbag apparatus according to claim 8, wherein a region between the fabric sheets that is below the lateral joint portion forms the lumbar region protecting portion, and wherein the upper region protecting portion has, as a flank protecting portion that is inflated and deployed beside at least a flank of the occupant, a region between the fabric sheets that is located rearward of the vertical joint portion.

10. The side airbag apparatus according to claim 8, wherein the region between the fabric sheets and between the vertical joint portion and the lateral joint portion is a non-inflation portion that is formed by a part of at least one of the fabric sheets and is not supplied with the inflation gas, and wherein the non-inflation portion is deployed has a thickness in the vehicle widthwise direction that is a second smallest thickness in the airbag.

11. The side airbag apparatus according to claim 10, wherein the vertical joint portion has at least in a part thereof a straight section that extends along the backrest of the vehicle seat, wherein the lateral joint portion has at least in a part thereof a straight section that extends along the seat cushion, and wherein extensions of the straight sections intersect each other at an obtuse angle.

12. The side airbag apparatus according to claim 8, wherein the vehicle seat includes a backseat in which the seat cushion and the body side portion are arranged to be close to each other, wherein the seat cushion has a side portion located on a vehicle outer side, the side portion having an upper edge, and wherein the lower edge of the lumbar region protecting portion is located above and in the vicinity of the vehicle outer side portion of the seat cushion and is formed to have a shape that conforms to the upper edge of the side portion.

13. The side airbag apparatus according to claim 1, wherein the airbag includes a femoral region protecting portion located forward of the lumbar region protecting portion, the femoral region protecting portion being inflated and deployed beside a femoral region of the occupant, thereby protecting the femoral region.

14. A side airbag apparatus mounted on a vehicle having a vehicle seat and a body side portion, the apparatus comprising:

an inflator; and an airbag that is inflated and deployed in a space between an occupant seated in the vehicle seat and the body side portion by inflation gas that is supplied from the inflator in response to an impact applied to the vehicle from a side, wherein the airbag includes a lumbar region protecting portion that is inflated and deployed at least beside the lumbar region of the occupant, thereby protecting the lumbar region, the vehicle seat includes a seat cushion that is inclined such that the height of the seat cushion in the vertical direction increase toward the front end, the lumbar region protecting portion has a part at which the thickness in the vehicle widthwise direction is the greatest, the position in the vertical direction of the part being lower than a highest point in a front portion of the seat cushion, the airbag includes an upper region protecting portion located at a position higher than the lumbar region protecting portion, the upper region protecting portion has a part with a smaller thickness in the vehicle widthwise direction than the part at which the thickness in the vehicle widthwise direction of the lumbar region protecting portion is the greatest, a loop inner joint portion is provided in the upper region protecting portion and arranged adjacent the lumbar region protecting portion, the loop inner joint portion having a smallest thickness in the vehicle widthwise direction of the airbag, the airbag includes a fabric sheet on a vehicle inner side and a fabric sheet on a vehicle outer side, the inner joint portion joins the fabric sheets to each other in a state where the fabric sheets are brought close to each other, and a part that is between the fabric sheets and surrounded by the inner joint portion is deployed has a thickness in the vehicle widthwise direction that is a second smallest thickness of the airbag.

15. A side airbag apparatus mounted on a vehicle having a vehicle seat and a body side portion, the apparatus comprising:

an inflator; and an airbag that is inflated and deployed in a space between an occupant seated in the vehicle seat and the vehicle body side portion by inflation gas that is supplied from the inflator in response to an impact applied to the vehicle from a side, wherein the airbag includes a lumbar region protecting portion that is inflated and deployed at least beside the lumbar region of the occupant, thereby protecting the lumbar region, the vehicle seat includes a seat cushion that is inclined such that the height of the seat cushion in the vertical direction increase toward the front end, the lumbar region protecting portion has a part at which the thickness in the vehicle widthwise direction is the greatest, the position in the vertical direction of the part being lower than a highest point in a front portion of the seat cushion, the airbag includes an upper region protecting portion located at a position higher than the lumbar region protecting portion, and the upper region protecting portion has a part with a smaller thickness in the vehicle widthwise direction than the part at which the thickness in the vehicle widthwise direction of the lumbar region protecting portion is the greatest, the airbag includes a fabric sheet on a vehicle inner side and a fabric sheet on a vehicle outer side, a vertical joint portion provided in a part that is spaced forward from the rear edge of the fabric sheets, the vertical joint portion joining the fabric sheets to each other in a state where the fabric sheets are brought close to each other, and a lateral joint portion provided in a part that is spaced upward from the lower edge of the fabric sheets, the lateral joint portion joining the fabric sheets to each other in a state where the fabric sheets are brought close to each other, and the upper region protecting portion has a part having a small width in the vehicle widthwise direction, the part being located in a region between the fabric sheets and between the vertical joint portion and the lateral joint portion.

* * * * *